US011383381B2

(12) United States Patent
Whitman et al.

(10) Patent No.: US 11,383,381 B2
(45) Date of Patent: Jul. 12, 2022

(54) FOOTSTEP CONTACT DETECTION

(71) Applicant: Boston Dynamics, Inc., Waltham, MA (US)

(72) Inventors: Eric Whitman, Waltham, MA (US); Alex Khripin, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 300 days.

(21) Appl. No.: 16/573,579

(22) Filed: Sep. 17, 2019

(65) Prior Publication Data

US 2021/0039253 A1 Feb. 11, 2021

Related U.S. Application Data

(60) Provisional application No. 62/883,636, filed on Aug. 6, 2019.

(51) Int. Cl.

| B25J 9/16 | (2006.01) |
| B25J 13/08 | (2006.01) |
| B62D 57/02 | (2006.01) |
| B62D 57/032 | (2006.01) |
| B62D 57/024 | (2006.01) |
| B62D 57/028 | (2006.01) |

(52) U.S. Cl.
CPC ............ *B25J 9/1633* (2013.01); *B25J 9/162* (2013.01); *B25J 9/1664* (2013.01); *B25J 13/085* (2013.01); *B62D 57/02* (2013.01); *B62D 57/024* (2013.01); *B62D 57/028* (2013.01); *B62D 57/032* (2013.01); *G05D 2201/0217* (2013.01)

(58) Field of Classification Search
USPC .......................................................... 700/245
See application file for complete search history.

(56) References Cited

U.S. PATENT DOCUMENTS

| 9,969,087 B1* | 5/2018 | Blankespoor .......... B25J 9/1666 |
| 2012/0221119 A1* | 5/2012 | Goldfarb .................. A61F 2/70 |
| | | 623/24 |
| 2015/0120044 A1* | 4/2015 | Cory .................... B62D 57/032 |
| | | 700/250 |

OTHER PUBLICATIONS

International Search Report, PCT/US2019/051535, dated Apr. 24, 2020, 14 pages.

(Continued)

*Primary Examiner* — Adam R Mott
*Assistant Examiner* — Achaiah Ruben Abul
(74) *Attorney, Agent, or Firm* — Knobbe, Martens, Olson & Bear, LLP

(57) ABSTRACT

A method of footstep contact detection includes receiving joint dynamics for a swing leg of the robot where the swing leg performs a swing phase of a gait of the robot. The method also includes receiving odometry defining an estimation of a pose of the robot and determining whether an unexpected torque on the swing leg corresponds to an impact on the swing leg. When the unexpected torque corresponds to the impact, the method further includes determining whether the impact is indicative of a touchdown of the swing leg on a ground surface based on the odometry and the joint dynamics. When the impact is not indicative of the touchdown of the swing leg, the method includes classifying a cause of the impact based on the odometry of the robot and the joint dynamics of the swing leg.

32 Claims, 13 Drawing Sheets

(56) References Cited

OTHER PUBLICATIONS

Gorner, Locomotion and Pose Estimation in Compliant, Torque-Controlled Hexapedal Robots, May 3, 2017, 162 pages.
Winkler et. al, Path planning with force-based foothold adaptation and virtual model control for torque controlled quadruped robots, May 31, 2014, 14 pages.

* cited by examiner

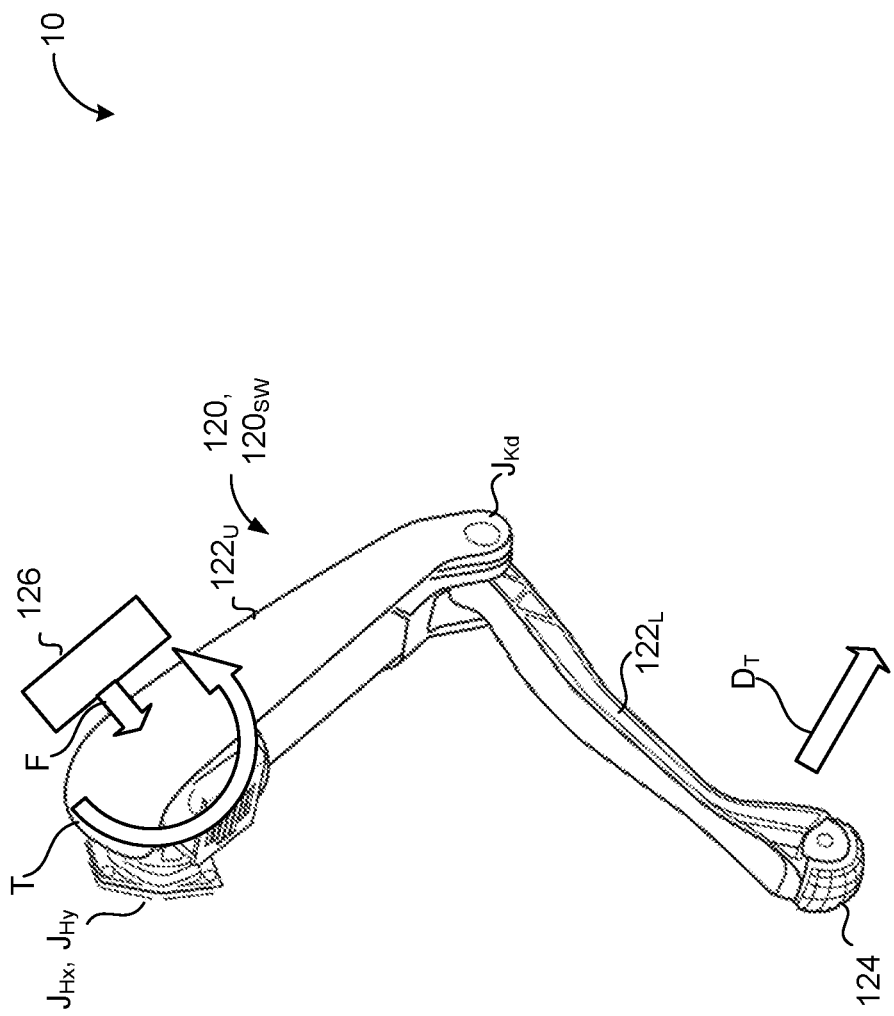

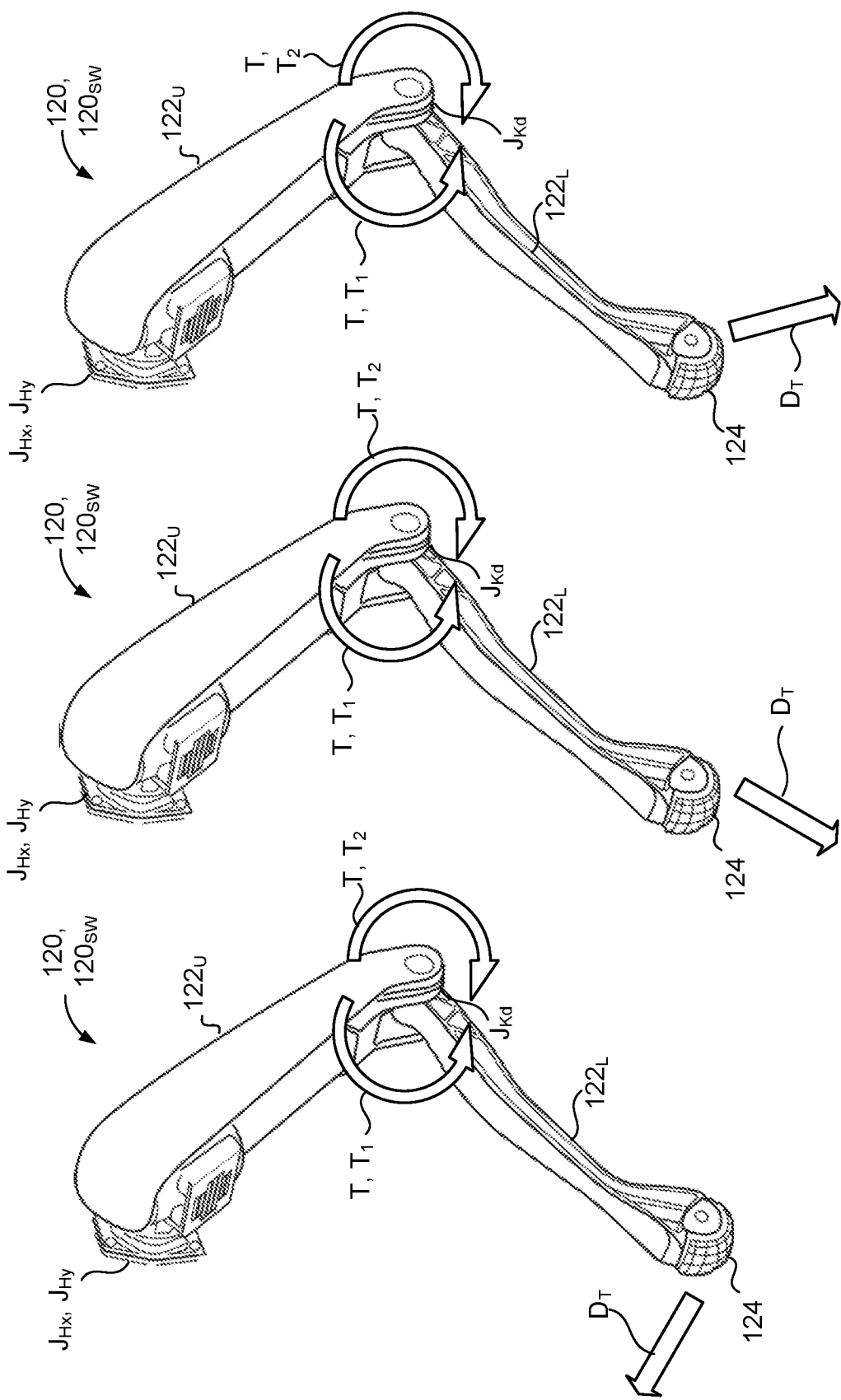

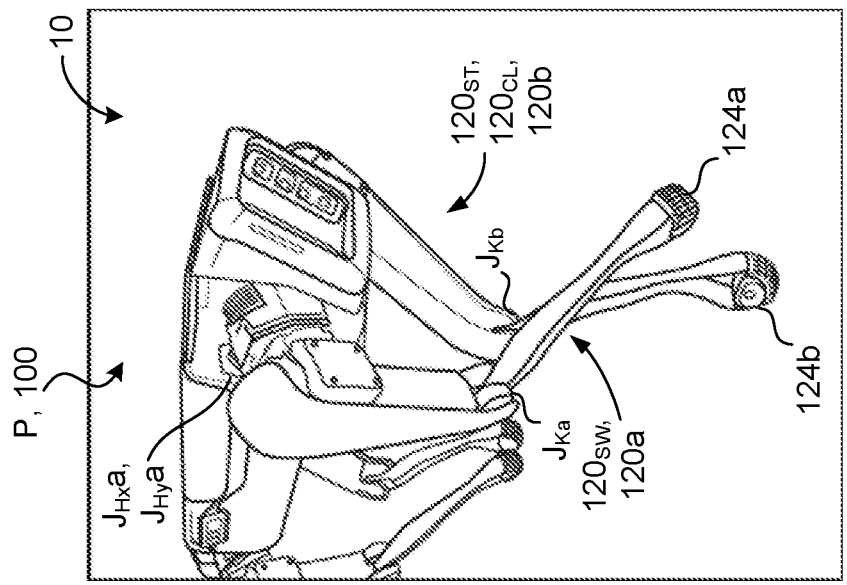
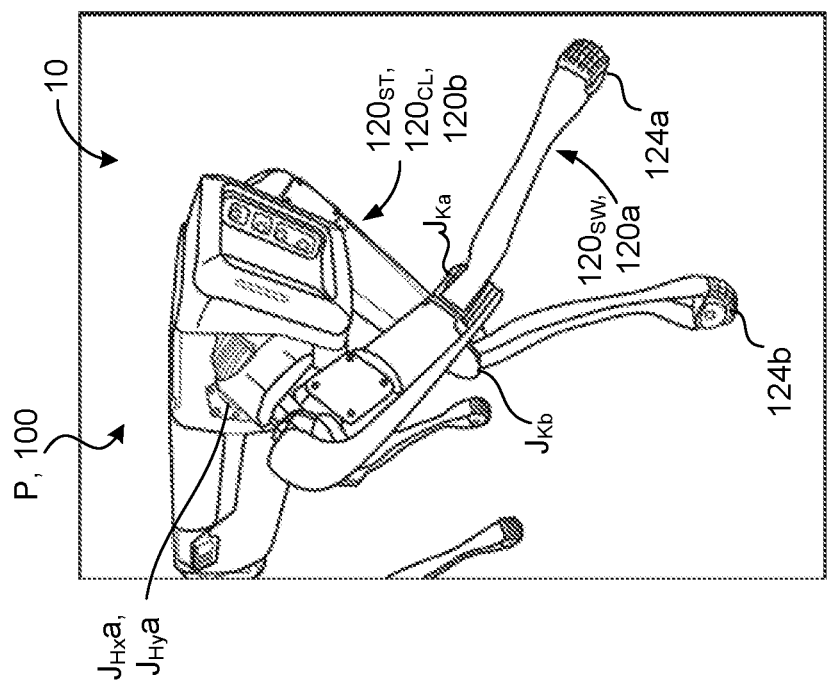
FIG. 2G
FIG. 2H

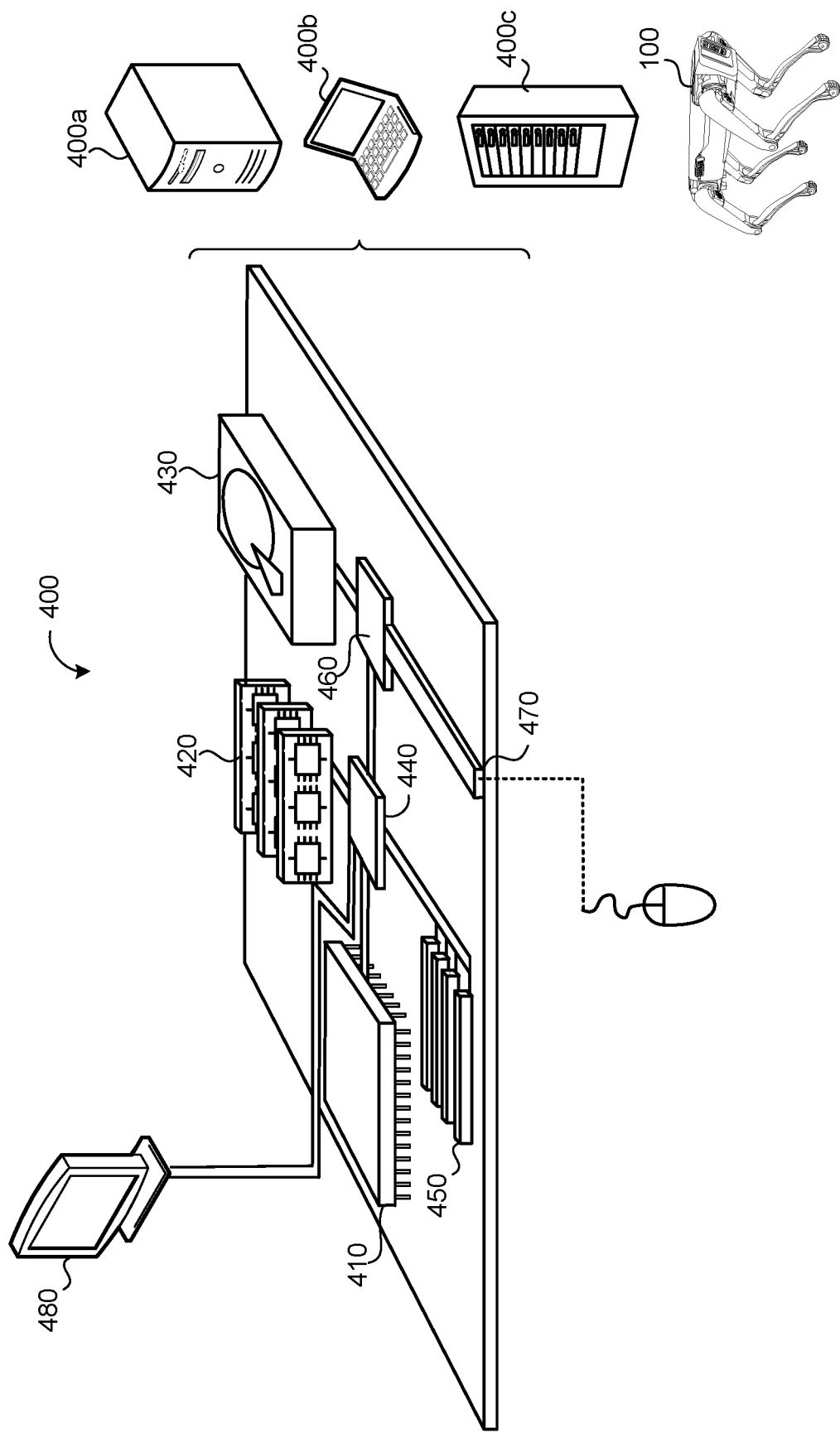

FOOTSTEP CONTACT DETECTION

CROSS REFERENCE TO RELATED APPLICATIONS

This U.S. patent application claims priority under 35 U.S.C. § 119(e) to U.S. Provisional Application 62/883,636, filed on Aug. 6, 2019. The disclosure of this prior application is considered part of the disclosure of this application and is hereby incorporated by reference in its entirety.

TECHNICAL FIELD

This disclosure relates to footstep contact detection.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles or features requiring various means of coordinated leg movement provides additional benefits to such industries.

SUMMARY

One aspect of the disclosure provides a method for footstep contact detection. The method includes receiving, at data processing hardware of a robot, joint dynamics for a swing leg of the robot. The swing leg performs a swing phase of a gait of the robot. The method also includes receiving, at the data processing hardware, odometry defining an estimation of a pose of the robot relative to a world reference frame. The method further includes determining, by the data processing hardware, whether an unexpected torque on the swing leg corresponds to an impact on the swing leg. When the unexpected torque on the swing leg corresponds to the impact, the method includes determining, by the data processing hardware, whether the impact is indicative of a touchdown of the swing leg on a ground surface about the robot based on the odometry of the robot and the joint dynamics of the swing leg. When the impact is not indicative of the touchdown of the swing leg, the method includes classifying, by the data processing hardware, a cause of the impact based on the odometry of the robot and the joint dynamics of the swing leg.

Implementations of the disclosure may include one or more of the following optional features. In some implementations, the method includes generating, by the data processing hardware, a response for the swing leg of the robot based on the classified cause of the impact. When the impact is indicative of the touchdown of the swing leg, the method may include changing, by the data processing hardware, a classification of the swing leg to a stance leg. The method may include elevating the swing leg as a response to the respective impact when the cause of the impact is classified as a trip.

In some examples, classifying the cause of the impact includes determining that a percent completion of the swing phase for the swing leg of the robot satisfies a swing phase threshold based on the joint dynamics of the swing leg, the swing phase threshold indicating that the swing leg is early in the swing phase. In this example, classifying the cause of the impact also includes classifying the cause of the impact on the swing leg as a liftoff scuffing. Here, the swing leg continues performing the swing phase of the gait responsive to classifying the cause of the impact on the swing leg as the liftoff scuffing.

In some configurations, classifying the cause of the impact includes determining that a hip joint of the swing leg exceeds a pre-determined motion limit based on the joint dynamics of the swing leg. Here, the joint dynamics include an abduction-adduction component of the hip joint relative to the ground surface and a flexion-extension component of the hip joint relative to the ground surface and the abduction-adduction component includes the pre-determined motion limit as a function of the flexion-extension component. In this configuration, classifying the cause of the impact also includes classifying the cause of the impact on the swing leg as the swing leg contacts a body of the robot. Here, the swing leg continues performing the swing phase of the gait responsive to classifying the cause of the impact on the swing leg as the swing leg contacts the body of the robot.

In some implementations, classifying the cause of the impact includes determining that a vector distance between a first closest point of the swing leg to a contralateral leg and a second closest point of the contralateral leg to the swing leg indicates the swing leg crossed the contralateral leg. Here, classifying the cause of the impact also includes determining that a distal end of the swing leg crossed a respective distal end of the contralateral leg, determining that a first knee joint of the swing leg crossed a second knee joint of the contralateral leg, classifying the condition causing the respective impact for the swing leg of the robot as the swing leg crossed the contralateral leg of the robot, and moving the swing leg to uncross with the contralateral leg of the robot.

In some examples, classifying the condition for the leg of the robot corresponding to the respective impact includes determining that the swing leg is positioned near a contralateral leg of the robot, determining that the torque corresponding to the respective impact results from joint dynamics predominantly from a lateral component of a hip joint of the swing leg, classifying the condition causing the respective impact for the swing leg of the robot as uncrossed contralateral leg impact, and moving the swing leg away from a sagittal plane of the robot.

In some configurations, classifying the condition for the leg of the robot corresponding to the respective impact includes determining that a knee of the swing leg is moving backwards during the swing phase, determining that the joint dynamics resulting in the unexpected torque corresponding to the respective impact comprise a flexion-extension torque about a hip joint of the swing leg that is greater than both a knee torque of the swing leg and an adduction-abduction torque about a hip joint of the swing leg, classifying the condition causing the respective impact for the swing leg of the robot as the knee of the swing leg contacting terrain behind a body of the robot, and shifting the knee of the swing leg forward relative to the body of the robot.

In some implementations, classifying the condition for the leg of the robot corresponding to the respective impact includes determining that a knee of the swing leg is adjacent to a perceived ground surface, the knee moving forward relative to a body of the robot, the perceived ground surface defined by sensor data about the robot. In this implementation, classifying the condition for the leg of the robot corresponding to the respective impact also includes determining that the knee of the swing leg is closer to the perceived ground surface than a distal end of the swing leg, determining that the unexpected torque corresponding to the respective impact occurs at a hip joint of the swing leg, classifying the condition causing the respective impact for the swing leg of the robot as the knee of the swing leg contacting terrain underneath the body of the robot, and continuing movement of the swing leg without response to the knee of the swing leg contacting terrain underneath the body of the robot.

In some examples, determining whether the unexpected torque on the swing leg of the robot corresponds to the impact on the swing leg includes determining whether the unexpected torque satisfies an impact detection threshold, the impact detection threshold including a magnitude of torque that corresponds to a known impact. In other examples, determining, by the data processing hardware, the unexpected torque on the swing leg is based on a difference between a measured torque measured by joint torque sensors about the robot, a first expected torque representing a respective torque caused by gravity, and a second expected torque representing a corresponding torque to accelerate the swing leg of the robot.

In some configurations, when a joint of the swing leg of the robot is adjacent to a limit on a range of motion for the joint, the method includes determining, by the data processing hardware, that the unexpected torque fails to indicate the impact on the swing leg during the swing phase. Determining whether the unexpected torque on the swing leg corresponds to the impact on the swing leg may include determining that the unexpected torque on the swing leg corresponds to an impact torque, the impact torque opposing motion of a joint of the swing leg.

In some implementations, the joint dynamics of the swing leg correspond to joint dynamics of a knee joint of the swing leg and joint dynamics of a hip joint of the swing leg. The joint dynamics of the hip joint may include an abduction-adduction torque abducting or adducting the swing leg and a flexion-extension torque flexing or extending the swing leg.

Another aspect of the disclosure provides a robot configured to perform footstep contact detection. The robot includes a body and two or more legs coupled to the body and configured to traverse an environment. The two or more legs include a swing leg. The robot also includes a control system in communication with the two or more legs where the control system includes data processing hardware and memory hardware in communication with the data processing hardware. The memory hardware stores instructions that when executed on the data processing hardware cause the data processing hardware to perform operations. The operations include receiving joint dynamics for the swing leg of the robot. The swing leg performs a swing phase of a gait of the robot. The operations also include receiving odometry defining an estimation of a pose of the robot relative to a world reference frame. The operations further include determining whether an unexpected torque on the swing leg corresponds to an impact on the swing leg. When the unexpected torque on the swing leg corresponds to the impact, the operations include determining whether the impact is indicative of a touchdown of the swing leg on a ground surface about the robot based on the odometry of the robot and the joint dynamics of the swing leg. When the impact is not indicative of the touchdown of the swing leg, the operations include classifying a cause of the impact based on the odometry of the robot and the joint dynamics of the swing leg.

Implementations of the disclosure may include one or more of the following optional features. In some implementations, the operations include generating a response for the swing leg of the robot based on the classified cause of the impact. When the impact is indicative of the touchdown of the swing leg, the operations may include changing a classification of the swing leg to a stance leg. The operations may include elevating the swing leg as a response to the respective impact when the cause of the impact is classified as a trip.

In some examples, classifying the cause of the impact includes determining that a percent completion of the swing phase for the swing leg of the robot satisfies a swing phase threshold based on the joint dynamics of the swing leg. Here, the swing phase threshold indicates that the swing leg is early in the swing phase. In this example, classifying the cause of the impact also includes classifying the cause of the impact on the swing leg as a liftoff scuffing. Here, the swing leg continues performing the swing phase of the gait responsive to classifying the cause of the impact on the swing leg as the liftoff scuffing.

In some configurations, classifying the cause of the impact includes determining that a hip joint of the swing leg exceeds a pre-determined motion limit based on the joint dynamics of the swing leg. Here, the joint dynamics include an abduction-adduction component of the hip joint relative to the ground surface and a flexion-extension component of the hip joint relative to the ground surface and the abduction-adduction component includes the pre-determined motion limit as a function of the flexion-extension component. In this configuration, classifying the cause of the impact also includes classifying the cause of the impact on the swing leg as the swing leg contacts a body of the robot. Here, the swing leg continues performing the swing phase of the gait responsive to classifying the cause of the impact on the swing leg as the swing leg contacts the body of the robot.

In some implementations, classifying the cause of the impact includes determining that a vector distance between a first closest point of the swing leg to a contralateral leg and a second closest point of the contralateral leg to the swing leg indicates the swing leg crossed the contralateral leg. Here, classifying the cause of the impact also includes determining that a distal end of the swing leg crossed a respective distal end of the contralateral leg, determining that a first knee joint of the swing leg crossed a second knee joint of the contralateral leg, classifying the condition causing the respective impact for the swing leg of the robot as the swing leg crossed the contralateral leg of the robot, and moving the swing leg to uncross with the contralateral leg of the robot.

In some examples, classifying the condition for the leg of the robot corresponding to the respective impact includes determining that the swing leg is positioned near a contralateral leg of the robot, determining that the torque corresponding to the respective impact results from joint dynamics predominantly from a lateral component of a hip joint of the swing leg, classifying the condition causing the respective impact for the swing leg of the robot as uncrossed contralateral leg impact, and moving the swing leg away from a sagittal plane of the robot.

In some configurations, classifying the condition for the leg of the robot corresponding to the respective impact includes determining that a knee of the swing leg is moving backwards during the swing phase, determining that the joint dynamics resulting in the unexpected torque corresponding to the respective impact comprise a flexion-extension torque about a hip joint of the swing leg that is greater than both a knee torque of the swing leg and an adduction-abduction torque about a hip joint of the swing leg, classifying the condition causing the respective impact for the swing leg of the robot as the knee of the swing leg contacting terrain behind a body of the robot, and shifting the knee of the swing leg forward relative to the body of the robot.

In some implementations, classifying the condition for the leg of the robot corresponding to the respective impact includes determining that a knee of the swing leg is adjacent to a perceived ground surface, the knee moving forward relative to a body of the robot, the perceived ground surface defined by sensor data about the robot. In this implementation, classifying the condition for the leg of the robot corresponding to the respective impact also includes determining that the knee of the swing leg is closer to the perceived ground surface than a distal end of the swing leg, determining that the unexpected torque corresponding to the respective impact occurs at a hip joint of the swing leg, classifying the condition causing the respective impact for the swing leg of the robot as the knee of the swing leg contacting terrain underneath the body of the robot, and continuing movement of the swing leg without response to the knee of the swing leg contacting terrain underneath the body of the robot.

In some examples, determining whether the unexpected torque on the swing leg of the robot corresponds to the impact on the swing leg includes determining whether the unexpected torque satisfies an impact detection threshold where the impact detection threshold includes a magnitude of torque that corresponds to a known impact. In other examples, determining the unexpected torque on the swing leg is based on a difference between a measured torque measured by joint torque sensors about the robot, a first expected torque representing a respective torque caused by gravity, and a second expected torque representing a corresponding torque to accelerate the swing leg of the robot.

In some configurations, when a joint of the swing leg of the robot is adjacent to a limit on a range of motion for the joint, the operations include determining that the unexpected torque fails to indicate the impact on the swing leg during the swing phase. Determining whether the unexpected torque on the swing leg corresponds to the impact on the swing leg may include determining that the unexpected torque on the swing leg corresponds to an impact torque, the impact torque opposing motion of a joint of the swing leg.

In some implementations, the joint dynamics of the swing leg correspond to joint dynamics of a knee joint of the swing leg and joint dynamics of a hip joint of the swing leg. The joint dynamics of the hip joint may include an abduction-adduction torque abducting or adducting the swing leg and a flexion-extension torque flexing or extending the swing leg.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2B-2E are schematic views of example swing legs during impact detection by the impact detection system for the robot of FIG. 1A.

FIGS. 2G-2L are perspective views of example impact conditions experienced by the robot of FIG. 1A.

FIG. 4 is a schematic view of an example computing device that may be used to implement the systems and methods described herein.

Like reference symbols in the various drawings indicate like elements.

DETAILED DESCRIPTION

As a robot maneuvers about an environment, various system of the robot communicate with the robot to indicate where to step (e.g., foot placement for a leg), how to move legs of the robot (e.g., swing trajectories), how to avoid obstacles, how to maintain balance, etc. One of the more critical aspects of robot movement is understanding the robot's relationship with its environment. For instance, one aspect is understanding how a structure of the robot interacts with itself or objects in the environment (e.g., a traction surface of the environment). During movement, these interactions depend not only on the environment, but also on characteristics of the robot (e.g., speed, gait, location, etc.). To understand these relationships for the robot, the robot uses various techniques for impact detection and/or impact reaction.

With a legged-robot, it may be important to accurately detect when a leg of the robot has contacted a traction surface (e.g., a ground surface). For instance, when a leg of the robot contacts the ground surface (i.e., touches down), but the robot does not detect the leg's touchdown, the robot will continue moving this leg downward, essentially attempting to push the leg through a ground surface. Here, when continuing to move the leg downward, the robot experiences a normal force from the ground surface acting on the leg. Problematically, this normal force may disrupt the balance of the robot and, in some situations, cause the robot to turn over (e.g., flip over). When the robot detects touchdown late, it affects lateral stability for the robot because the robot experiences a larger than expected impact. In other words, the robot does not anticipate ground impact when it actually occurs. Therefore, the robot may not account for, or properly counterbalance, such an impact.

Besides accurately detecting touchdown, the robot also employs impact detection to detect trips. A trip generally refers to a disruption in a gait of the robot. In other words, the robot may have a planned movement trajectory (e.g., based on a gait controller), but trip due to contact with some object, element of the environment, or itself. For both trips and traction surface contact (e.g., touchdown of a leg), it may be advantageous to not only detect such conditions, but also to minimize a time it takes to detect and/or to respond to such a condition. Often with trips, the more quickly a robot detects a trip, the less force (or rotation) the robot will experience from the trip. Additionally, there may be a proportional relationship between how fast a trip is detected and a likelihood that a robot will overcome the trip condition (e.g., stabilize or continue with motion). In other words, quickly detecting a trip may allow systems of the robot to quickly react and/or respond to a trip. Therefore, trip detection aims to minimize disruptions to the robot during movement about the environment.

Figure 1A:
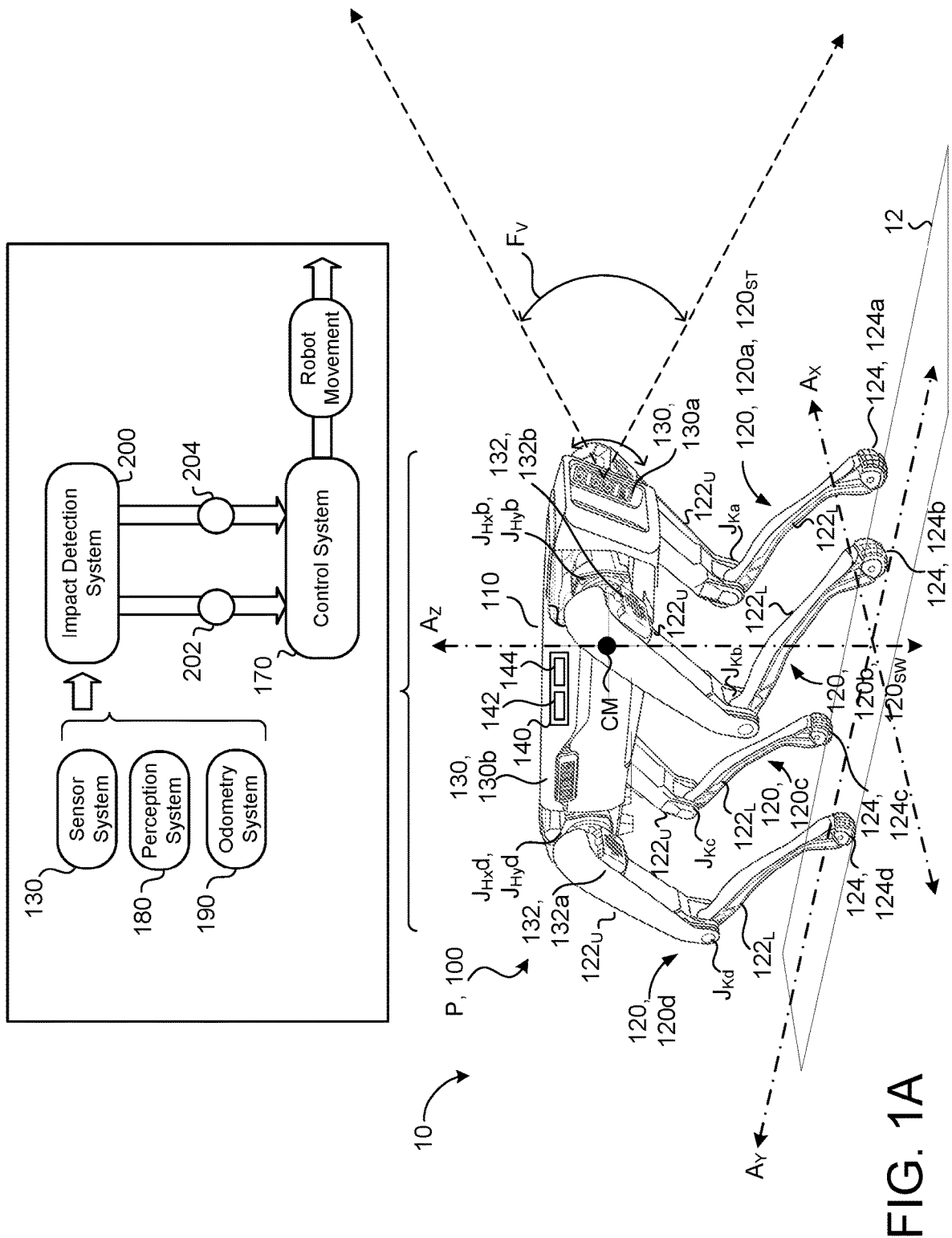
FIG. 1A is a schematic view of an example robot within an environment.

Referring to FIG. 1A, the robot 100 includes a body 110 with locomotion based structures such as legs 120a-d coupled to the body 110 that enable the robot 100 to move about the environment 10. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. For impact detection, the hip joint $J_H$ may be further broken down into abduction-adduction rotation of the hip joint $J_H$ designated as "$J_{Hx}$" for occurring in a frontal plane of the robot 100 (i.e., a X-Z plane extending in directions of a x-direction axis $A_x$ and the z-direction axis $A_Z$) and a flexsion-extension rotation of the hip joint $J_H$ designated as "$J_{Hy}$" for occurring in a sagittal plane of the robot 100 (i.e., a Y-Z plane extending in directions of a y-direction axis $A_Y$ and the z-direction axis $A_Z$). Although FIG. 1A depicts a quadruped robot with four legs 120a-d, the robot 100 may include any number of legs or locomotive based structures (e.g., a biped or humanoid robot with two legs) that provide a means to traverse the terrain within the environment 10.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint $J_A$ such that the distal end 124 is articulable with respect to the lower member $122_L$ of the leg 120.

The robot 100 has a vertical gravitational axis (e.g., shown as a Z-direction axis $A_Z$) along a direction of gravity, and a center of mass CM, which is a point where the weighted relative position of the distributed mass of the robot 100 sums to zero. The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 10. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

When a legged-robot moves about the environment 10, the legs 120 of the robot undergo a gait cycle. Generally, a gait cycle begins when a leg 120 touches down or contacts a ground surface 12 and ends when that same leg 120 once again contacts the ground surface 12. The gait cycle may predominantly be divided into two phases, a swing phase and a stance phase. During the swing phase, a leg 120 performs (i) lift-off from the ground surface 12 (also sometimes referred to as toe-off and the transition between the stance phase and swing phase), (ii) flexion at a knee joint $J_K$ of the leg 120, (iii) extension of the knee joint $J_K$ of the leg 120, and (iv) touchdown back to the ground surface 12. Here, a leg 120 in the swing phase is referred to as a swing leg $120_{SW}$. As the swing leg $120_{SW}$ proceeds through the movement of the swing phase $120_{SW}$, another leg 120 performs the stance phase. The stance phase refers to a period of time where a distal end 124 (e.g., a foot) of the leg 120 is on the ground surface 12. During the stance phase a leg 120 performs (i) initial ground surface contact which triggers a transition from the swing phase to the stance phase, (ii) loading response where the leg 120 dampens ground surface contact, (iii) mid-stance support for when the contralateral leg (i.e., the swing leg $120_{SW}$) lifts-off and swings to a balanced position (about halfway through the swing phase), and (iv) terminal-stance support from when the robot's COM is over the leg 120 until the contralateral leg 120 touches down to the ground surface 12. Here, a leg 120 in the stance phase is referred to as a stance leg $120_{ST}$.

In order to maneuver about the environment 10, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

In some implementations, the sensor system 130 includes sensor(s) 132 coupled to a joint J. In some examples, these sensors 132 couple to a motor that operates a joint J of the robot 100 (e.g., sensors 132, 132a-b). Here, these sensors 132 generate joint dynamics 134, $134_{JD}$ in the form of joint-based sensor data 134. Joint dynamics $134_{JD}$ collected as joint-based sensor data 134 may include joint angles (e.g., an upper member $122_U$ relative to a lower member $122_L$), joint speed (e.g., joint angular velocity or joint angular acceleration), and/or joint torques experienced at a joint J (also referred to as joint forces). Here, joint-based sensor data 134 generated by one or more sensors 132 may be raw sensor data, data that is further processed to form different types of joint dynamics $134_{JD}$, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 10, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 of the robot 100. With the sensor data 134, a perception system 200 of the robot 100 may generate maps 182 for the terrain about the environment 10.

While the robot 100 maneuvers about the environment 10, the sensor system 130 gathers sensor data 134 relating to the terrain of the environment 10 and/or structure of the robot 100 (e.g., joint dynamics and/or odometry of the robot 100). For instance, FIG. 1A depicts the sensor system 130 gathering sensor data 134 about a room as the environment 10 of the robot 100. As the sensor system 130 gathers sensor data 134, a computing system 140 is configured to store, to process, and/or to communicate the sensor data 134 to various systems of the robot 100 (e.g., the control system 170, the perception system 180, the odometry system 190, and/or the impact detector 200). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

Figure 1B:
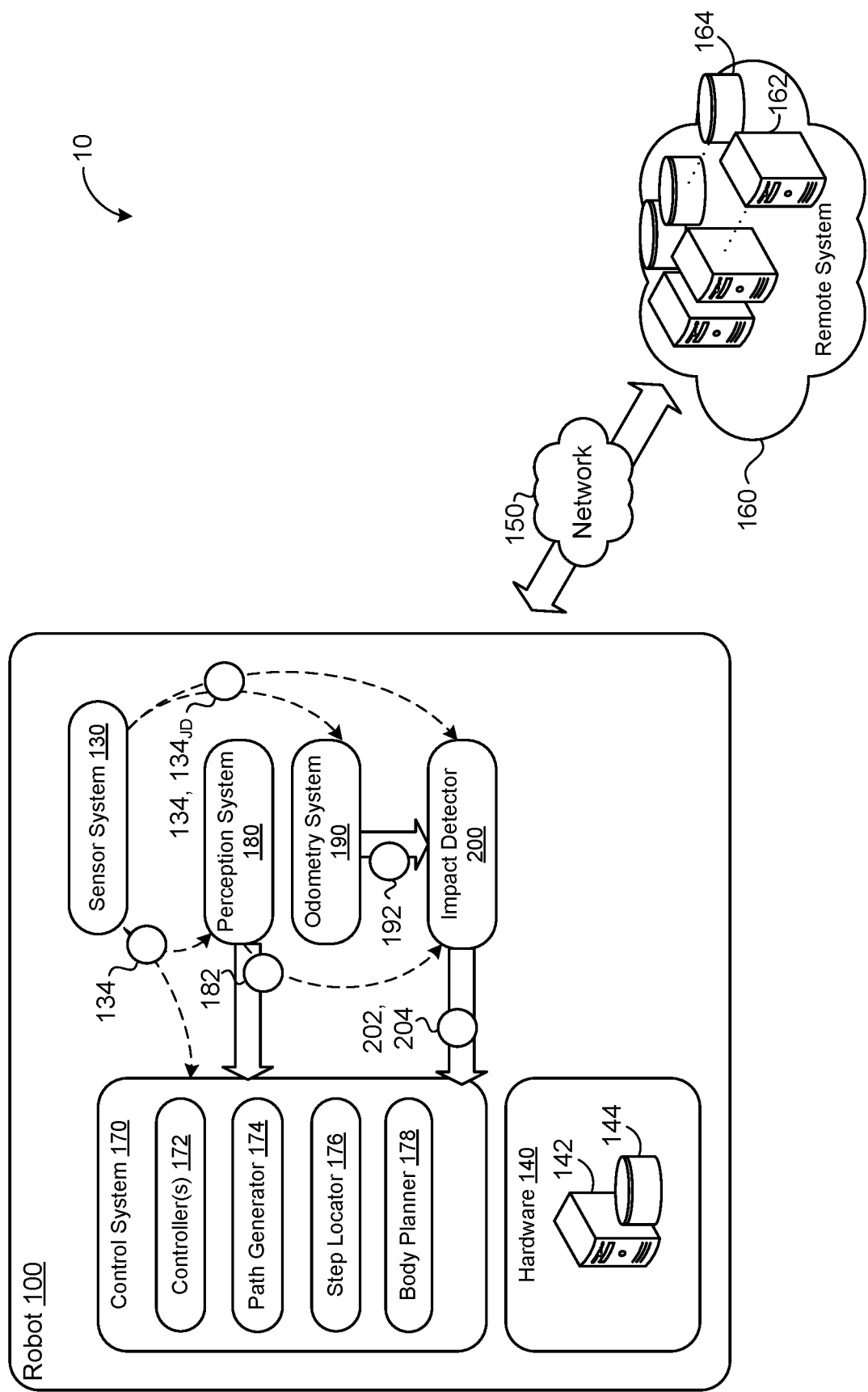
FIG. 1B is a schematic view of example systems for the robot of FIG. 1A.

In some implementations, as shown in FIGS. 1A and 1B, the robot 100 includes a control system 170 and a perception system 180. The perception system 180 is configured to receive the sensor data 134 from the sensor system 130 and to process the sensor data 134 into maps 182. With the maps 182 generated by the perception system 180, the perception system 180 may communicate the maps 182 to the control system 170 in order perform controlled actions for the robot 100, such as moving the robot 100 about the environment 10. In some examples, by having the perception system 180 separate from, yet in communication with the control system 170, processing for the control system 170 may focus on controlling the robot 100 while the processing for the perception system 180 focuses on interpreting the sensor data 134 gathered by the sensor system 130. For instance, these systems 170, 180 execute their processing in parallel to ensure accurate, fluid movement of the robot 100 in an environment 10.

In some examples, the control system 170 includes at least one controller 172, a path generator 174, a step locator 176, and a body planner 178. The control system 170 may be configured to communicate with at least one sensor system 130 and any other system of the robot 100 (e.g., the perception system 180, the odometry system 190, and/or the impact detector 200). The control system 170 performs operations and other functions using hardware 140. The controller 172 is configured to control movement of the robot 100 to traverse about the environment 10 based on input or feedback from the systems of the robot 100 (e.g., the control system 170, the perception system 180, the odometry system 190, and/or the impact detector 200). This may include movement between poses and/or behaviors of the robot 100. For example, the controller 172 controls different footstep patterns, leg patterns, body movement patterns, or vision system sensing patterns.

In some examples, the controller 172 includes a plurality of controllers 172 where each of the controllers 172 has a fixed cadence. A fixed cadence refers to a fixed timing for a step or swing phase of a leg 120. For example, the controller 172 instructs the robot 100 to move the legs 120 (e.g., take a step) at a particular frequency (e.g., step every 250 milliseconds, 350 milliseconds, etc.). With a plurality of controllers 172 where each controller 172 has a fixed cadence, the robot 100 can experience variable timing by switching between controllers 172. In some implementations, the robot 100 continuously switches/selects fixed cadence controllers 172 (e.g., re-selects a controller 170 every 3 milliseconds) as the robot 100 traverses the environment 10.

Referring to FIG. 1B, the path generator 174 is configured to determine horizontal motion for the robot 100. For instance, the horizontal motion refers to translation (i.e., movement in the X-Y plane) and/or yaw (i.e., rotation about the Z-direction axis $A_Z$) of the robot 100. The path generator 174 determines obstacles within the environment 10 about the robot 100 based on the sensor data 134. The path generator 174 communicates the obstacles to the step locator 176 such that the step locator 176 may identify foot placements for legs 120 of the robot 100 (e.g., locations to place the distal ends 124 of the legs 120 of the robot 100). The step locator 176 generates the foot placements (i.e., locations where the robot 100 should step) using inputs from the perceptions system 180 (e.g., map(s) 182). The body planner 178, much like the step locator 176, receives inputs from the perceptions system 180 (e.g., map(s) 182). Generally speaking, the body planner 178 is configured to adjust dynamics of the body 110 of the robot 100 (e.g., rotation, such as pitch or yaw and/or height of COM) to successfully move about the environment 10.

The perception system 180 is a system of the robot 100 that helps the robot 100 to move more precisely in a terrain with various obstacles. As the sensors 132 collect sensor data 134 for the space about the robot 100 (i.e., the robot's environment 10), the perception system 180 uses the sensor data 134 to form one or more maps 182 for the environment 10. Once the perception system 180 generates a map 182, the perception system 180 is also configured to add information to the map 182 (e.g., by projecting sensor data 134 on a preexisting map) and/or to remove information from the map 182.

Referring further to FIG. 1B, the odometry system 190 is configured to measure where the robot 100 is located within a world reference frame (e.g., the environment 10) and how fast the robot 100 is moving in that world reference frame. In other words, the odometry system 190 generates odometry information 192 as one or more estimations (e.g., measurements) for a characteristic of the robot 100 relative to a world reference frame. In some examples, the odometry system 190 receives sensor data 134 from a sensor 132 such as an IMU (e.g., accelerometer(s) and/or gyro(s)). With the sensor data 134, the odometry system 190 may generate odometry information 192 based on an assumption that when a distal end 124 of a leg 120 is in contact with the ground surface 12 and not slipping, the distal end 124 is stationary. By combining this assumption with the sensor data 134, the odometry system 190 generates odometry information 192 regarding robot motion relative to the world reference frame (e.g., the environment 10). In other words, the odometry system 190 accounts for kinematics and inertial measurements to produce estimations about the robot 100 with respect to the world reference frame.

The impact detection system 200 of the robot 100 is configured to receive inputs from other systems of the robot 100 (e.g., the sensor system 130, the computing system 140, the remote system 160, the control system 170, the perception system 180, and/or the odometry system 190). By capitalizing on information from the other systems of the robot 100, the impact detection system 200 attempts to make an informed decision to identify an impact 202, classify the impact 202, and, in some instances, generate a response 204 to the impact 202 (e.g., invoke a trip response). In some examples, the impact detection system 200 receives joint dynamics $134_{JD}$ as inputs. For example, the impact detection system 200 receives joint forces $134_{JD}$, $134_{JD}a$ to enable the impact detection system 200 to detect when a distal end 124 (also referred to as a foot 124 of the robot 100) contacts the ground surface 12. In some examples, the impact detection system 200 receives joint angles $134_{JD}$, $134_{JD}b$ to detect when the distal end 124 stops moving and/or a location of the distal end 124 relative to the ground surface 12 (e.g., as perceived by the robot 100). In some implementations, the impact detection system 200 receives angular velocities $134_{JD}$, $134_{JD}c$ to detect a velocity of the distal end 124 (e.g., to detect whether the foot has stopped moving relative to the ground). Although FIG. 2A depicts the impact detection system 200 receiving each of the joint forces, joint angles, and angular velocities $134_{JD}a$-$c$, some types of detection by the impact detection system 200 may use more or less inputs.

In some configurations, in addition to the joint dynamics $134_{JD}$, the impact detection system 200 receives odometry 192 of the robot 100. The odometry enables the impact detection system 200 to determine estimations for dynamics of the structure of the robot 100 by accounting for both kinematics of a world reference frame (e.g., the robot 100 with respect to the environment 10) and kinematics of a relative reference frame (e.g., the body 110 or legs 120 of the robot 100 with respect to the robot 100 itself). For example, a velocity of a foot 124 of the robot 100 is equal to a velocity of the body 110 in the world reference frame (e.g., as determined by the odometry system 190) plus a velocity of the foot 124 relative to the body 110 (e.g., as sensed by the sensor system 130).

Additionally or alternatively, the impact detection system 200 receives a map 182 from the perception system 180 (e.g., in addition to joint dynamics $134_{JD}$ and/or odometry 192). In some examples, the impact detection system 200 accounts for failures of the perception system 180 to understand trip conditions or traction surface contact. Yet in some implementations, maps 182 of the perception system 180 allow the impact detection system 200 to classify a type of trip. For example, it is more likely that the foot 124 touched down against the ground surface when a map 182 perceived the ground surface as near to the foot 124 than if the map 182 did not perceive the foot 124 in the vicinity of the ground surface 12.

Figure 2A:
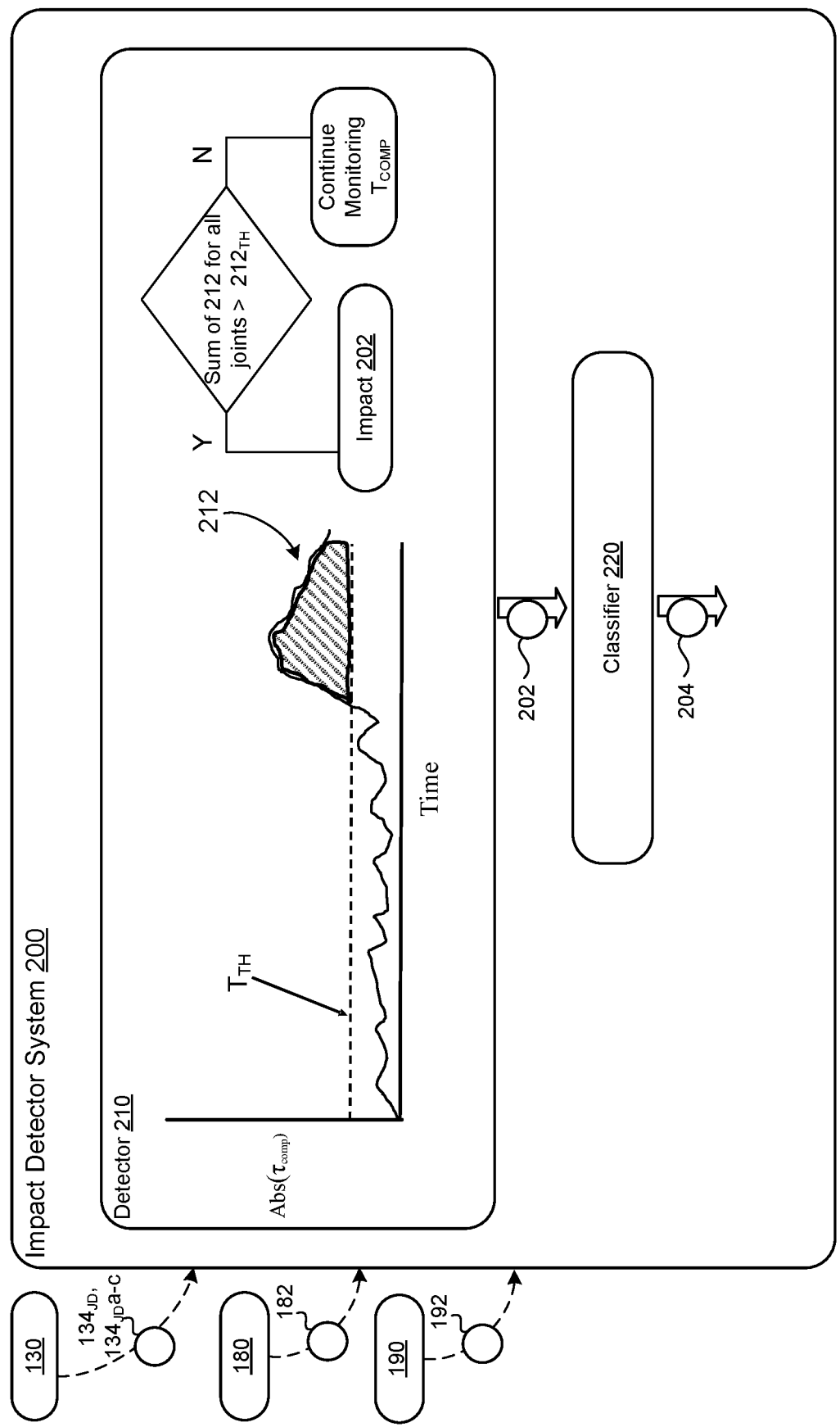
FIG. 2A is a schematic view of an example impact detection system for the robot of FIG. 1A.

Referring to FIG. 2A, the impact detection system 200 includes a detector 210. The detector 210 is configured to identify unexpected force(s) F (or torques T) on one or more legs 120 (e.g., feet) of the robot 100. When the impact detection system 200 identifies an unexpected force F (or torque T), the impact detection system 200 determines whether the unexpected force F corresponds to an impact 202. During movement, a swing leg $120_{SW}$ typically generates a minimal amount of torque T. This minimal amount of torque T is generally predictable by inverse dynamics. In other words, based on inverse dynamics and gravity, there is an expected amount of torque T that acts on the swing leg $120_{SW}$. This expected amount of torque T is equal to a torque contributed by gravity (i.e., gravitational torque $T_g$) in combination with a torque T that is expected in order to accelerate the leg 120 to achieve gait motion (i.e., torque from inverse dynamics $T_{ID}$). Because a majority of the torque T experienced by a swing leg $120_{SW}$ is known, the detector 210 is configured to determine an unexpected torque T (also referred to as a compensated torque $T_{comp}$). For example, Equation (1) below illustrates an equation that the detector 210 uses to determine the compensated torque $T_{com}$.

$$T_{comp} = T_{measured} - T_g - T_{ID} \qquad (1)$$

Here, $T_{measured}$ is the torque measured from joint sensor(s) 132. In other words, the detector 210 is configured to receive and/or to determine a measured amount of torque $T_{measured}$ acting on the swing leg $120_{SW}$ based on sensor data 134 (e.g., from sensors 132 at joints J of the robot 100) from the sensor system 130. With the measured amount of torque $T_{measured}$ and the expected torques T (i.e., the gravitational torque $T_g$ and the torque from inverse dynamics $T_{ID}$), the detector 210 determines the compensated torque $T_{comp}$. Based on the compensated torque $T_{comp}$, the detector 210 is configured to identify when the swing leg $120_{SW}$ experiences an impact 202.

In some implementations, the detector 210 determines whether the torque T on the swing leg $120_{SW}$ corresponds to an impact 202 on the swing leg $120_{SW}$ by determining whether the compensated torque $T_{comp}$ satisfies an impact torque threshold $T_{th}$ (e.g., the detector 210 determines that the compensated torque $T_{comp}$ exceeds a value set as the impact torque threshold $T_{th}$). Here, the impact torque threshold $T_{TH}$ is configured to represent how much noise the impact detection system 200 expects during impact detection. In other words, the detector 210 may be configured with an impact torque threshold $T_{TH}$ to ensure that the detector 210 generally does not falsely detect an impact 202 based on sensor noise. When the compensated torque $T_{comp}$ satisfies the impact torque threshold $T_{th}$, the detector 210 communicates that an impact 202 (or a potential impact 202) has occurred on the swing leg $120_{SW}$. Conversely, when the compensated torque $T_{comp}$ fails to satisfy the impact torque threshold $T_{th}$, the detector 210 continues monitoring the torque T on the swing leg $120_{SW}$.

In some examples, the detector 210 monitors the torque T on each joint J of the swing leg $120_{SW}$. For instance, the detector 210 monitors the torque T at the knee joint $J_K$, the abduction-adduction component of the hip joint $J_{Hx}$, and the flexion-extension component of the hip joint $J_{Hy}$. In some implementations, for each joint J, the detector 210 generates evidence 212 corresponding to a potential impact. Here, as shown in FIG. 2A, the evidence 212 refers to an area under a curve representing the compensated torque $T_{COMP}$ that is greater than the impact torque threshold $T_{TH}$. For instance, the detector 210 generates the evidence 212 as the integral under the curve representing the compensated torque $T_{COMP}$, but above the impact torque threshold $T_{TH}$. As shown in FIG. 2A, to determine the evidence 212, the detector 210 integrates the absolute value of the compensated torque $T_{COMP}$.

When the detector 210 generates evidence 212, the detector 210 may be further configured to remove evidence 212 when the value of the compensated torque $T_{COMP}$ indicates an impact 202 has not occurred. In some examples, the curve representing the compensated torque $T_{COMP}$ will exceed the impact torque threshold $T_{TH}$, but then drop to a value below the impact torque threshold $T_{TH}$. When this drop below the impact torque threshold $T_{TH}$ occurs, the detector 210 removes the evidence 212 to reduce the likelihood that the impact detection system 200 identifies a false impact. Similarly, in some implementations, the value of the compensated torque $T_{COMP}$ indicates an impact 202 has not occurred because the value of the compensated torque $T_{COMP}$ changes signs (e.g., from positive to negative or vice versa). Here, the detector 210 clears any evidence 212 prior to the sign change because the impact detection system 200 is configured to identify an impact 202 as a having the same sign (e.g., based on the integral of the absolute value of the compensated torque $T_{COMP}$). Therefore, a change in sign indicates a potential false impact.

In some examples, the detector 210 determines that an impact 202 occurs on the swing leg $120_{SW}$ when a sum of the evidence 212 for all joints J of a leg 120 satisfy an evidence threshold $212_{TH}$. Here, the evidence threshold $212_{TH}$ refers to a required amount of evidence that the swing leg $120_{SW}$ experiences overall across all joints J that indicates an impact 202. Although FIG. 2A depicts the detector 210 determining whether the sum of the evidence 212 for all joints J of a leg 120 satisfies an evidence threshold $212_{TH}$, other configurations of the detector 210 may perform this determination for less than all joints J of a leg 120 (e.g., for the knee joint $J_K$ and one component of the hip joint $J_H$ or both components of the hip joint $J_H$ without knee joint $J_K$).

In some configurations, the evidence threshold $212_{TH}$ depends on the swing phase. For instance, the impact detection system 200 is configured to have greater sensitivity when a touchdown of the swing leg $120_{SW}$ is expected than when a touchdown of the swing leg $120_{SW}$ is not expected. Based on this, the evidence threshold $212_{TH}$ may be scaled or modified based on a percent completion of the swing phase. Here, other systems of the robot 100 may communicate the percent completion of the swing phase to the impact detector system 200. For example, the control system 170 communicates the percent completion of the swing phase to the impact detection system 200 because the percent completion may be derived based on a controller 172 performing the gait cycle for the swing leg $120_{SW}$ having a fixed cadence. In some examples, the impact detection system 200 is configured to determine the percent completion of the swing phase based on a current location of the swing leg $120_{SW}$ (e.g., as determined by sensor data 134) and a controller 172 operating the swing leg $120_{SW}$.

Referring to FIG. 2B, in some implementations, the detector 210 is configured to perform further analysis on a potential impact or an impact 202. In other words, there may be circumstances where although the required evidence $212_{TH}$ indicates an impact 202, the actual circumstances of the detected impact 202 may be analyzed to confirm whether the detected impact 202 is an actual impact. In some examples, such as FIG. 2B, the structure of a leg 120 of the robot 100 includes end stops 126 that restrict a range of motion of the leg 120. For instance, the range of motion is limited by an end stop 126 to prevent damage to the structure of the leg 120 or based on limitations of one or more motors that articulate the leg 120. When an end stop restricts 126 a range of motion of the leg 120, the joint sensors 132 of the leg 120 may experience a sudden measured torque caused by a force F exerted by the end stop 126. Even though this force F from the end stop 126 generates a correct sign for the torque T, the detector 210 is configured to ignore an impact 202 that occurs subsequent to when the detector 210 identifies the swing leg $120_{SW}$ is near an end stop 126.

Referring to FIGS. 2C-2E, the detector 210 may be configured to ensure that a torque T causing a potential impact 202 always opposes motion of the leg 120 (e.g., motion of a foot 124 of the swing leg $120_{SW}$). In other words, the impact detection system 200 does not classify a condition as an impact 202 when the condition results in a measured torque that speeds up an associated joint J of the leg 120 (e.g., speeds up the leg 120 itself). FIGS. 2C-2E illustrate conditions where the detector 210 determines whether a torque T corresponding to an impact 202 opposes motion of the leg 120 (e.g., shown as motion of the foot 124 of the leg 120). In each example, the foot 124 is moving in a direction of travel designated DT. Referring to FIG. 2C, the foot 124 is traveling to the left such that the detector 210 only considers a first torque T, $T_1$ at the knee joint $J_K$ and not a second torque T, $T_2$ at the knee joint $J_K$ because the second torque $T_2$ contributes to the motion of the foot 124. In FIG. 2D, the direction of travel DT for the foot 124 is downward. Since a torque T in either direction may include opposing this downward motion, the detector 210 is configured to consider acting torque T in either direction (e.g., the first torque $T_1$ or the second torque $T_2$) when the potential torque contribution is unclear. In FIG. 2E, the direction of travel DT for the foot 124 is mostly downward, but with a directional component moving to the right. Here, the detector 210 may apply a weight to torques T in each direction such that the detector 210 requires a larger torque T in a direction that opposes the directional component of the foot 124 (e.g., the second torque $T_2$) to ensure that the torque T corresponds to an impact 202 (or vice versa).

In some examples, the detector 210 identifies the velocity of the foot 124 and then determines whether a potential impact torque T increases or decreases the velocity of the foot 124. When the potential impact torque T contributes to an increase in the velocity of the foot 124, the detector 210 ignores this impact 202 (or potential impact). On the other hand, when the potential impact torque T contributes to a decrease in the velocity of the foot 124, the detector 210 may permit this impact 202 to be detected as an actual impact (e.g., subject to other criteria of the detector 210).

Figure 2F:
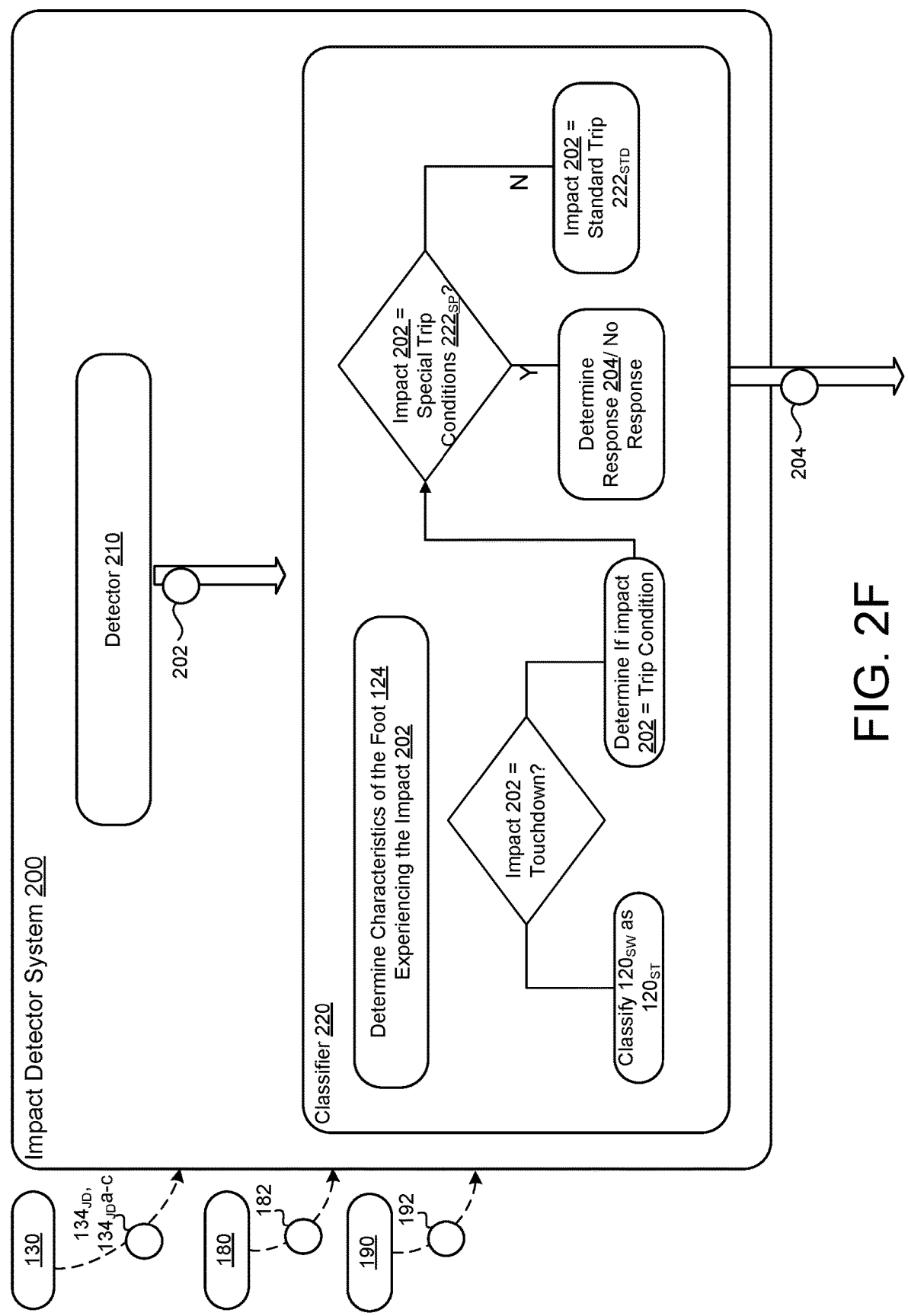
FIG. 2F is a schematic view of an example impact detection system for the robot of FIG. 1A.

Referring to FIGS. 2A and 2F, when the detector 210 detects an impact 202, the detector 210 is configured to communicate that impact 202 to a classifier 220 of the impact detection system 200. The classifier 220 is configured to determine a condition of the impact 202. In other words, what type of impact 202 occurred or is occurring to the leg 120 of the robot 100 and, depending on the type of impact 202, generate a response 204. In some examples, the classifier 220 communicates the response 204 to the other systems of the robot 100 (e.g., the control system 170). When the control system 170 receives the response 204, a controller 172 of the control system 170 may generate an appropriate movement to overcome the impact 202 (e.g., stabilize the robot 100). In some examples, the classifier 220 is configured in a hierarchy such that the classifier 220 attempts to classify certain types of impacts 202 before other types of impacts 202 (e.g., touchdown contact before a trip condition).

In some examples, the classifier 220 utilizes characteristics of the distal end 124 (i.e., the foot 124) of the leg 120 that experiences the impact 202 to classify the impact 202. More particularly, the classifier 220 may use the position of the foot 124 in the world (e.g., derived from some combination of joint dynamics $134_{JD}$ and odometry information 192), a velocity of the foot 124 in the world (e.g., derived from some combination of joint dynamics $134_{JD}$ and odometry information 192), and forces on the foot 124 in the world frame. Here, the forces on the foot 124 in the world frame may be derived in two different ways. In a first approach, the classifier 220 may determine the forces in the world frame by deriving the forces from joint torques T of the joint dynamics $134_{JD}$ based on Jacobian transformation. In a second approach, classifier 220 uses inverse dynamics to generate the force on the foot 124 in the world frame. In some examples, the classifier 220 determines the force on the foot 124 based on both the first approach and the second approach, but uses whichever approach generates a force on the foot 124 in the world frame closer to zero to perform classification. In some implementations, when classifying a type of impact 202, the classifier 220 associates an importance to the dynamics of the foot 124. For instance, the force on the foot 124 is the most important characteristic, followed by the velocity of the foot 124, and followed by the position of the foot 124 as the least important for classification purposes.

Referring to FIG. 2F, in some examples, the classifier 220 first determines whether the impact 202 corresponds to a touchdown of the swing leg $120_{SW}$. To classify the impact 202 as a touchdown, the classifier 220 generally determines whether a distal end 124 of the leg 120 experiences significant vertical forces (e.g., indicating a normal force from the ground surface 12) and/or whether the velocity of the distal end 124 is no longer moving downward even though the control system 170 is instructing the distal end 124 to move downward. Here, the classifier 220 may be configured with a vertical force threshold that indicates a significant magnitude of a vertical force (e.g., that risks destabilization of the robot 100). In other words, when the classifier 220 determines that a vertical force on the distal end 124 satisfies the vertical force threshold (e.g., exceeds a value set as the vertical force threshold), the classifier 220 classifies the impact 202 on the swing leg $120_{SW}$ as a touchdown. In some implementations, the classifier 220 modifies the vertical force threshold based on certain circumstances. For instance, the classifier 220 modifies the vertical force threshold when the robot 100 (e.g., via the control system 170) is responding to a trip (e.g., the impact detection system 200 generated a response 204 to an impact 202). In another examples, the classifier 220 modifies the vertical force threshold based on the swing phase (e.g., a percent completion of the swing phase). To illustrate, the classifier 220 may modify the vertical force threshold when the classifier 220 is aware the swing leg $120_{SW}$ is early in the swing phase (e.g., shortly after lift-off). Additionally or alternatively, when the classifier 220 identifies the impact 202 as a standard trip, but the robot 100 is unable to elevate the foot 124 as a response 204 to the standard trip, the classifier 220 classifies the impact 202 instead as a touchdown.

In some configurations, when the swing leg $120_{SW}$ is near an end of completion for the swing phase, the classifier 220 classifies any new impact 202 as a touchdown. For example, when a percent completion of the swing phase is greater than or equal to 95% complete, the classifier 220 classifies an impact 202 as a touchdown. Here, this condition protects the robot 100 from risking destabilization by a sudden undetected touchdown or other issues that may result from late detection of touchdown.

In some examples, the classifier 220 classifies the impact 202 as touchdown when the swing leg $120_{SW}$ is late in the swing phase and a planned trajectory for the swing leg $120_{SW}$ is moving downward toward the ground surface 12. For example, when a percent completion of the swing phase is about greater than or equal to 65% complete and the planned trajectory for the swing leg $120_{SW}$ is moving downward toward the ground surface 12, the classifier 220 classifies an impact 202 as a touchdown.

In these examples, where the swing leg $120_{SW}$ is late in the swing phase and the planned trajectory for the swing leg $120_{SW}$ is moving downward toward the ground surface 12, there may be additional criterial, but alternative criteria that the classifier 220 uses to classify an impact 202 as a touchdown. A first additional criteria may be that the force on the foot 124 is significantly large (e.g., satisfies the vertical force threshold or some version thereof). A second additional criterial may be that an impulse experienced by the foot 124 is quite large. For example, much like the vertical force threshold, the classifier 220 is configured with an impulse threshold that indicates an amount of force over time experienced by the foot 124 that indicates a touchdown (e.g., an impulse on the foot 124 exceeds the impulse threshold configured at the impact detection system 200). A third additional criteria may be that a measured velocity of the foot 124 is not as downward (in the z-direction towards the ground surface 12) as intended (e.g., by the control system 170). For example, the change in position of the foot 124 is greater than a threshold velocity of the foot 124 (e.g., greater than −0.5 m/s) such that although the control system 170 intended the foot 124 to be moving downwards in the z-direction towards the ground surface 12, the foot 124 is actually moving in decreasing speed towards the ground surface 12.

Referring further to FIG. 2F, when the impact 202 does not correspond to a touchdown of the swing leg $120_{SW}$, the classifier 220 is configured to identify whether the impact 202 was caused by a special type of trip condition 222, $222_{SP}$. Some examples of special trip conditions $222_{SP}$ include the following: when the thigh $122_U$ of the leg 120 is on the body 110; when the foot 124 experiences liftoff scuffing; when the swing leg $120_{SW}$ crosses a contralateral leg $120_{CL}$ (FIGS. 2G and 2H); when the swing leg $120_{SW}$ strikes the contralateral leg $120_{CL}$ (FIG. 2I); when the knee of the robot 100 is on terrain behind the robot 100 (FIG. 2J); and when the knee of the leg 120 is on terrain under the robot 100 (FIG. 2K). In some implementations, the classifier 220 identifies special trip condition $222_{SP}$ based on joint dynamics $134_{JD}$ and/or odometry information 192 of the robot 100. When the classifier 220 identifies a special type of trip condition $222_{SP}$, depending on the type of trip, the classifier 220 (i) may generate a response 204 to overcome the trip and/or to reduce the effects of the trip. When the classifier 220 determines that the impact 202 was not caused by a special type of trip condition $222_{SP}$, the classifier 220 classifies the impact 202 as caused by a standard trip condition 222, $222_{STD}$ (e.g., shown in FIG. 2L). For a standard trip condition $222_{STD}$, the classifier 220 generates a response 204 to elevate the foot 124 that experienced the impact 202 (i.e., to increase the height of the foot 124 in the z-direction). FIG. 2L illustrates a standard trip condition $222_{STD}$ for the robot 100.

In some configurations, when the classifier 220 determines that the impact 202 was not caused by a touchdown of the swing leg $120_{SW}$ and the swing leg $120_{SW}$ is early in the swing phase (e.g., less than 10% complete with the swing phase), the classifier 220 classifies the impact 202 as a liftoff scuffing. In some examples, the classifier 220 determines that a percent completion of the swing phase satisfies a swing phase threshold (e.g., is less than the swing phase threshold) that indicates that the swing leg $120_{SW}$ is early in the swing phase. Here, a liftoff scuffing refers to when the swing leg $120_{SW}$ contacts the ground surface as the swing leg $120_{SW}$ lifts-off the ground surface 12 (e.g., the robot 100 stubs its foot 124 as it takes off). In this special trip condition $222_{SP}$, the swing leg $120_{SW}$ will continue lifting off the ground surface 12 and thus clear the ground surface 12 that caused the impact 202. Therefore, the classifier 220 does not generate a response 204 based on this liftoff scuffing because the swing leg $120_{SW}$ does not risk any resistance as a result of the impact 202.

In some configurations, the classifier 220 determines that a position of the thigh (i.e., upper member $122_L$ of the leg 120) on the body 110 of the robot 100 caused the detected impact 202. Here, this special trip condition $222_{SP}$ occurs when the joint dynamics $134_{JD}$ indicate that the abduction-adduction component of the hip joint $J_{Hx}$ exceeds a predetermined limit. Generally speaking, each component of the hip joint $J_{Hx,z}$ may be configured with a predetermined limit. For instance, the control system 170 or another system of the robot 100 may set the predetermined limits based on the dimensions of the robot 100 and/or a payload of the robot 100. In some examples, the abduction-adduction component of the hip joint $J_{Hx}$ has a predetermined limit that is a function of the flexion-extension component of the hip joint $J_{Hy}$. In other words, when the abduction/adduction exceeds the predetermined limit for the abduction-adduction component of the hip joint $J_{Hx}$, the upper member $122_U$ of the leg 120 risks collision with the body 110 of the robot 100. Much like the special trip condition $222_{SP}$ of liftoff scuffing, the classifier 220 does not generate a response 204 based on this type of impact 202 and the swing leg $120_{SW}$ continues performing the swing phase of the gait.

Referring to FIGS. 2G and 2H, in some examples, the classifier 220 determines that the swing leg $120_{SW}$ (e.g., shown as a first leg 120a) crossed the contralateral leg $120_{CL}$ (e.g., shown as a second leg 120b, $120_{ST}$) to cause the impact 202. Here, a contralateral leg $120_{CL}$ refers to a relationship between two legs 120a-b such that the first leg 120a is opposite the sagittal plane (i.e., the Y-Z plane) from the second leg 120b. For instance, with a quadruped robot (as shown) the stance leg $120_{ST}$ is generally a contralateral leg $120_{CL}$ to the swing leg $120_{SW}$ (and vice versa) to maintain balance for the robot 100 during movement. In some examples, the classifier 220 determines this type of special trip condition $222_{SP}$ by determining whether the swing leg $120_{SW}$ is near a contralateral leg $120_{CL}$ based on kinematics of the robot 100. In these examples, determining whether the swing leg $120_{SW}$ is near a contralateral leg $120_{CL}$ may include determining a vector distance between a first closest point of the swing leg $120_{SW}$ to the contralateral leg $120_{CL}$ and a second closest point of the contralateral leg $120_{CL}$ to the swing leg $120_{SW}$. Here, when the vector distance indicates the swing leg $120_{SW}$ crossed the contralateral leg $120_{CL}$, the classifier 220 may additionally determine whether the feet 124a-b of each leg $120_{SW}$, $120_{CL}$ are crossed and/or whether the knee joints $J_K$, $J_K$a-b of each leg $120_{SW}$, $120_{CL}$ are crossed. In some configurations, the classifier 220 is configured to determine that one or more of these conditions are true (e.g., one is true, two are true, or all three are true). In other words, the classifier 220 determines whether (i) the vector distance indicates the legs $120_{SW}$, $120_{CL}$ are crossed, (ii) the position of the knee joints $J_K$, $J_K$a-b indicates that the legs $120_{SW}$, $120_{CL}$ are crossed, or (iii) the position of the feet 124a-b indicates that the legs $120_{SW}$, $120_{CL}$ are crossed. When the swing leg $120_{SW}$ crossing the contralateral leg $120_{CL}$ results in an impact 202, the classifier 220 may generate a response 204 to uncross the legs $120_{SW}$, $120_C$. For instance, the classifier 220 moves the knee joint $J_K$ of the swing leg $120_{SW}$ towards a vertical axis in the z-direction of the hip joint $J_H$ of the swing leg $120_{SW}$.

Figure 2I:
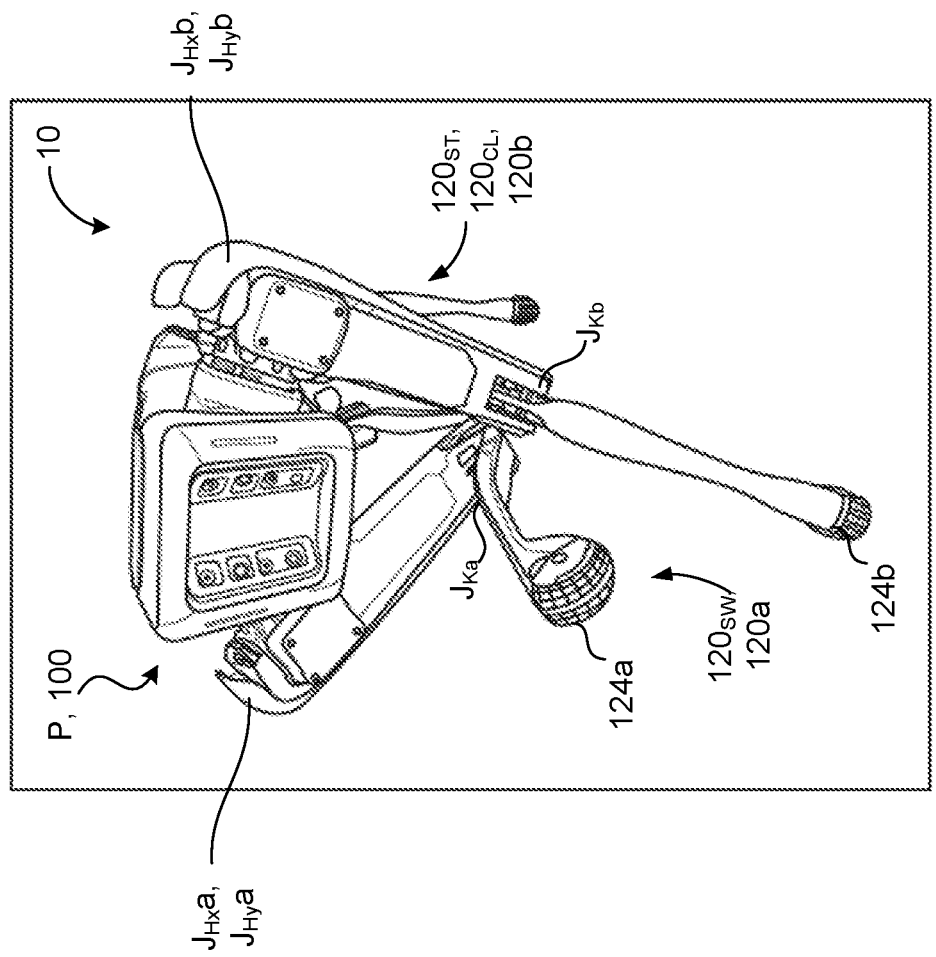
Figure 2J:
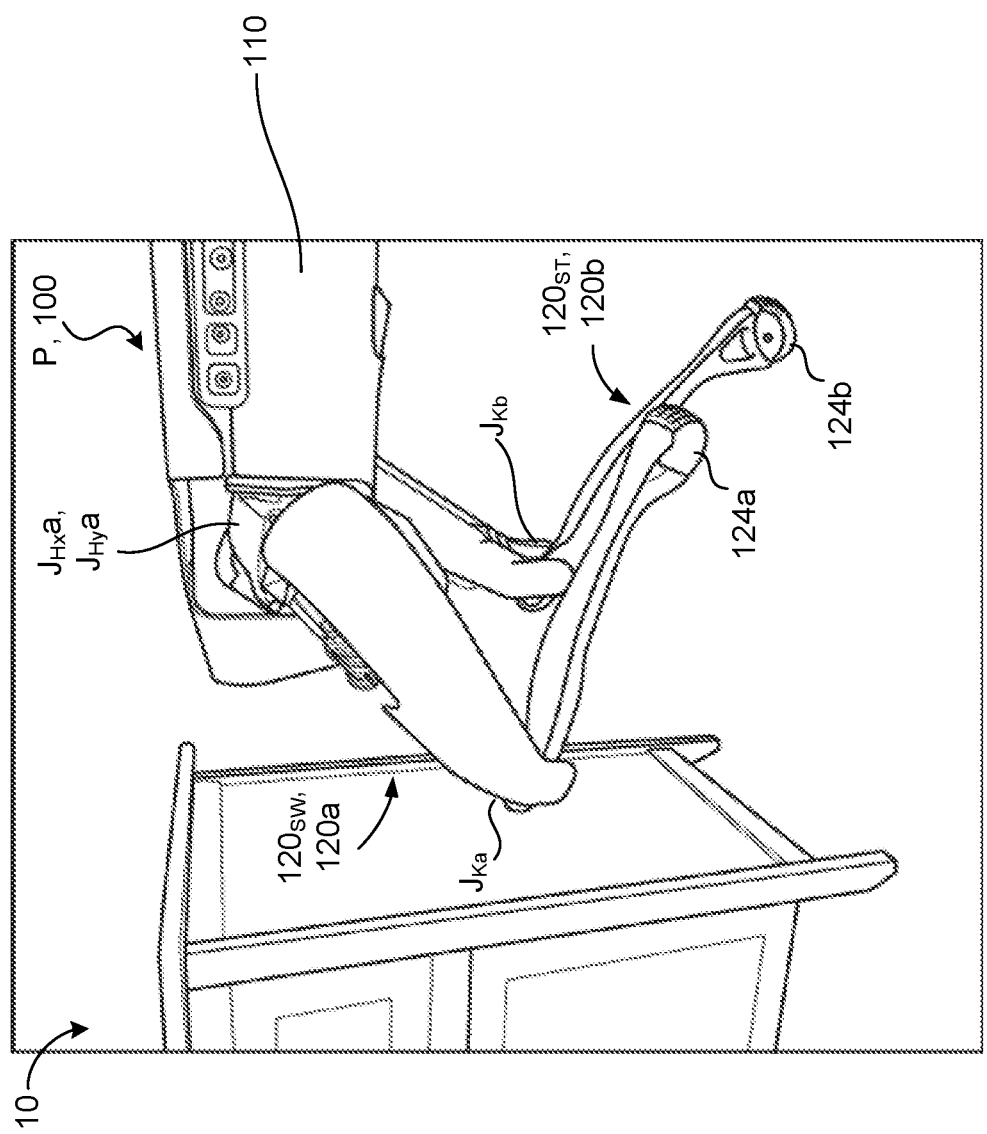
Figure 2K:
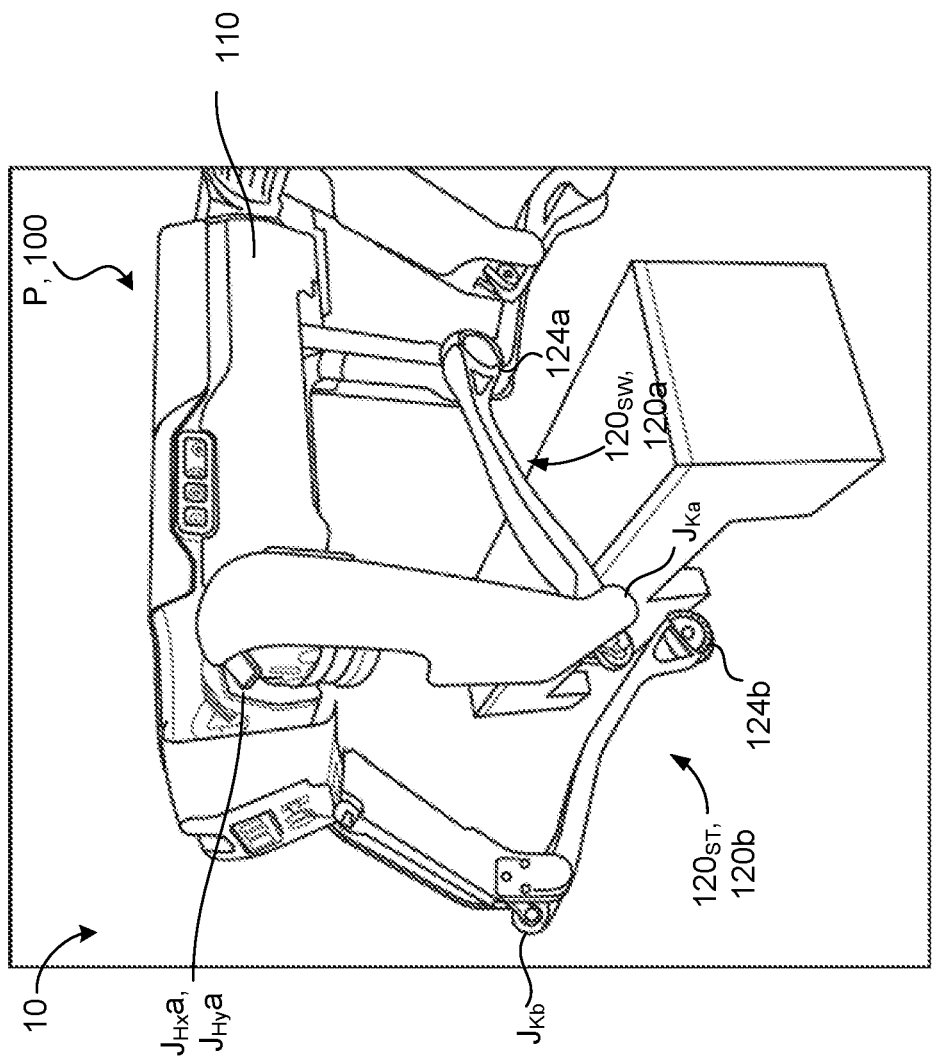
Figure 2L:
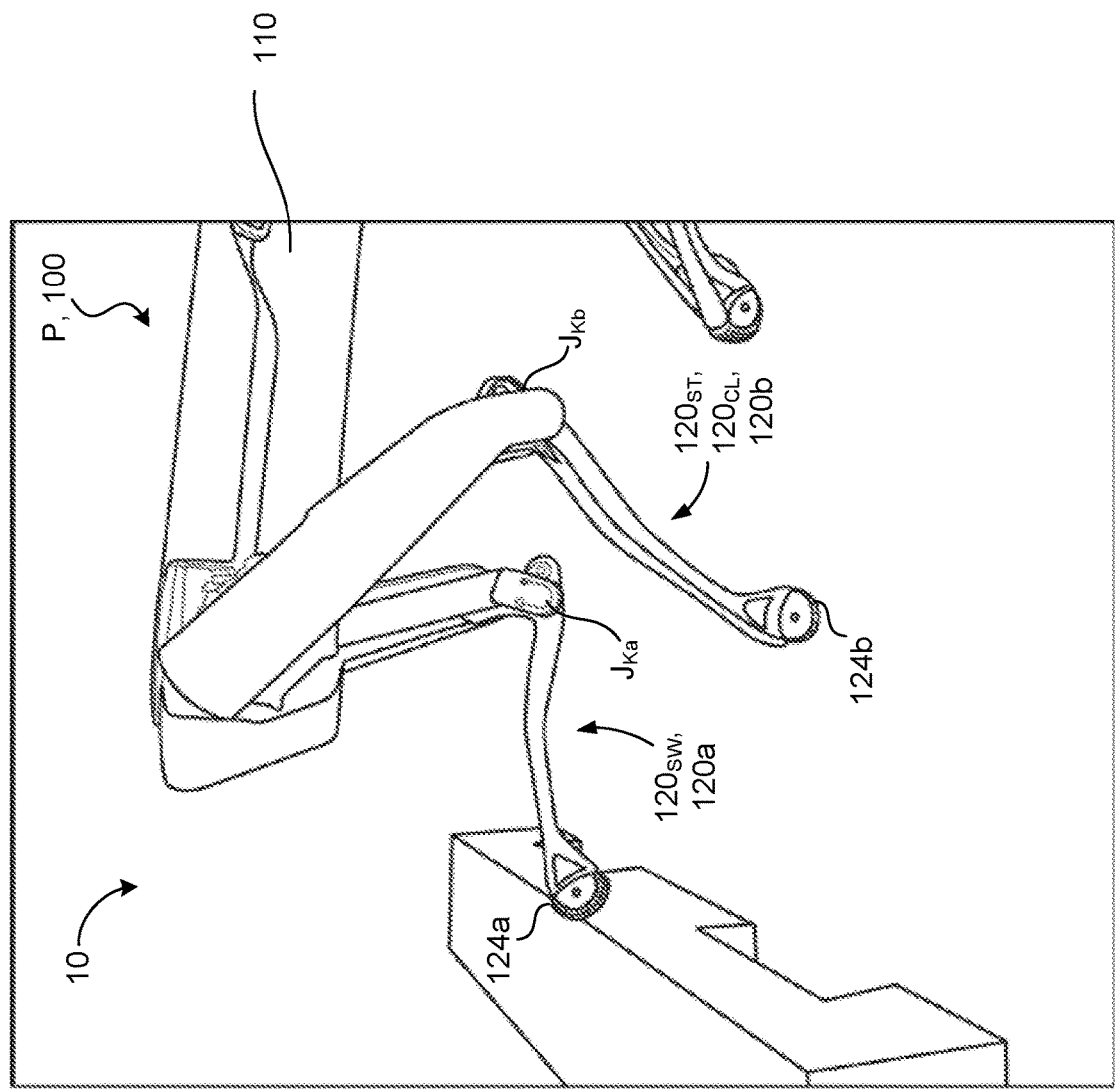

Referring to FIG. 2I, in some implementations, the classifier 220 determines that the swing leg $120_{SW}$ is near a contralateral leg $120_{CL}$, but not crossed over the contralateral leg $120_{CL}$ (e.g., based on kinematics of the robot 100). Here, the classifier 220 may determine the swing leg $120_{SW}$ contacted the contralateral leg $120_{CL}$ causing the impact 202, but did not cross over the contralateral leg $120_{CL}$ during, before, or shortly thereafter the impact 202. In some examples, the classifier 220 forms this determination by identifying (i) that the swing leg $120_{SW}$ is not too late in the swing phase (e.g., less than 65% complete) and (ii) that the evidence 212, which the detector 210 used to determine the impact 202, was predominantly from the abduction-adduction component of the hip joint $J_{Hx}$. In other words, the torque of lateral rotation of the hip joint $J_{Hx}$ was a greater contributor to the evidence 212 identifying the impact 202 than torques of the flexion-extension component of the hip joint $J_{Hy}$ and the knee joint $J_K$ (e.g., each separately or combined together). When the swing leg $120_{SW}$ collides with the contralateral leg $120_{CL}$ causing the impact 202, the classifier 220 may generate a response 204 to separate the legs $120_{SW}$, $120_{CL}$ (e.g., by moving one or more legs $120_{SW}$, $120_{CL}$ away from each other in the frontal plane). In other words, swing leg $120_{SW}$ may continue its originally planned motion within the sagittal plane while overriding the originally planned motion in the frontal plane (e.g., along the x-axis $A_X$) to separate from the stance leg $120_{ST}$.

Referring to FIGS. 2K-2L, in some configurations, the classifier 220 determines that a collision between the leg 120 (e.g., the swing leg $120_{SW}$) and terrain either behind (e.g., shown in FIG. 2J) or beneath (e.g., shown in FIG. 2K) the body 110 of the robot 100 causes the impact 202. In the case of a special trip condition $222_{SP}$ where the impact 202 occurs based on contact between a knee joint $J_K$ of the swing leg $120_{SW}$ and the terrain behind the robot 100, the classifier 220 determines (i) that the knee joint $J_K$ of the swing leg $120_{SW}$ is moving backwards away from the body 110 (e.g., in the y-direction) and (ii) that the evidence 212 indicates that the flexion-extension component of the hip joint $J_{Hy}$ for the swing leg $120_{SW}$ is the largest contributor of joint torque. In some examples, the flexion-extension component of the hip joint $J_{Hy}$ for the swing leg $120_{SW}$ is larger than the joint torque T contribution of both the knee joint $J_K$ and the abduction-adduction component of the hip joint $J_{Hx}$ (e.g., separately or in combination). In some implementations, the classifier 220 uses the kinematics of the swing leg $120_{SW}$ to determine that the knee joint $J_K$ of the swing leg $120_{SW}$ is moving backwards away from the body 110. When the classifier 220 classifies the impact 202 as a collision between the leg 120 and the terrain behind the robot 100, the classifier 220 generates a response 204 to move bring the knee joint $J_K$ forward (e.g., towards the CM of the robot 100 along the y-direction).

Referring to FIG. 2L, here, the classifier 220 determines that a collision between the leg 120 and the terrain beneath the body 110 of the robot 100 caused the impact 202. To determine this special trip condition $222_{SP}$, the classifier 220 determines that the knee joint $J_K$ is moving forward (e.g., forward in the y-direction with respect to the hip joint $J_H$ of the swing leg $120_{SW}$) and that the evidence 212 producing the impact 202 occurred in joints J other than the knee joint $J_K$. Additionally or alternatively, the classifier 220 may use one or more maps 182 of the perception system 180 to determine that the knee joint $J_K$ of the swing leg $120_{SW}$ is closer to the ground surface 12 than the foot 124 of the swing leg $120_{SW}$. The map 182 may also indicate that the knee joint $J_K$ of the swing leg $120_{SW}$ was recently perceived near the ground surface 12. In this special trip condition $222_{SP}$, the classifier 220 is configured to not generate a response 204 because the forward motion of the swing leg $120_{SW}$ by continuing the swing phase of the gait will carry the knee joint $J_K$ past the object causing the impact 202.

In some examples, the impact detection system 200 may be advantageous when the perception system 180 is either off or not functioning well (e.g., issues with sensor(s) 132). When this occurs, the impact detection system 200 may be used as a primary system for detection within the environment 10. Conversely, when the perception system 180 is working properly, the impact detection system 200 may offer a robust auxiliary system for detection, especially in instances when the perception system 180 makes a mistake or encounters a temporary issue.

Figure 3:
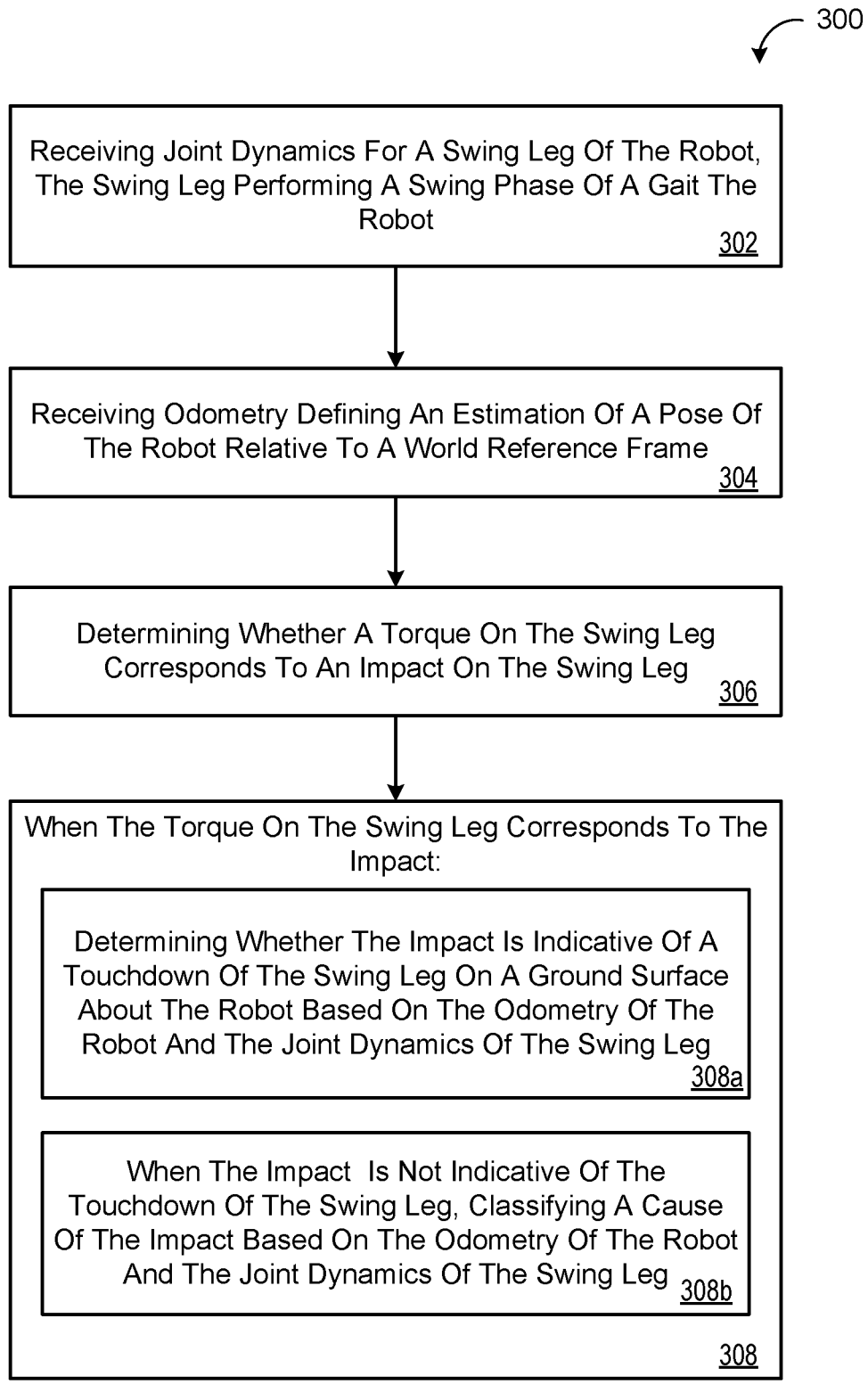
FIG. 3 is example arrangement of operations for a robot to detect impacts in environment about the robot.

FIG. 3 is an arrangement of operations to perform a method 300 of footstep contact detection. At operation 302, the method 300 receives joint dynamics $134_{JD}$ for a swing leg $120_{SW}$ of a robot 100. Here, the swing leg $120_{SW}$ performs a swing phase of a gait of the robot 100. At operation 304, the method 300 receives odometry 192 that defines an estimation of characteristics (e.g., a pose) of the robot 100 relative to a world reference frame. At operation 306, the method 300 determines whether a torque T on the swing leg $120_{SW}$ corresponds to an impact 202 on the swing leg $120_{SW}$. When the torque T on the swing leg $120_{SW}$ corresponds to the impact 202, at operation 308, 308a, the method 300 determines whether the impact 202 is indicative of a touchdown of the swing leg $120_{SW}$ on a ground surface 12 about the robot 100 based on the odometry 192 of the robot 100 and the joint dynamics $134_{JD}$ of the swing leg $120_{SW}$. At operation 308, 308b, when the impact 202 is not indicative of the touchdown of the swing leg $120_{SW}$, the method 300 classifies a cause of the impact 202 based on the odometry 192 of the robot 100 and the joint dynamics $134_{JD}$ of the swing leg $120_{SW}$.

FIG. 4 is schematic view of an example computing device 400 that may be used to implement the systems (e.g., the sensor system 130, the computing system 140, the remote system 160, the control system 170, the perception system 180, the odometry system 190, and/or the impact detection system 200) and methods (e.g., method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at data processing hardware of a robot, joint dynamics for a swing leg of the robot, the swing leg performing a swing phase of a gait of the robot;
receiving, at the data processing hardware, odometry defining an estimation of a pose of the robot relative to a world reference frame;
determining, by the data processing hardware, whether an unexpected torque on the swing leg corresponds to an impact on the swing leg; and
when the unexpected torque on the swing leg corresponds to the impact:
determining, by the data processing hardware, whether the impact is indicative of a touchdown of the swing leg on a ground surface about the robot based on a percent completion of the swing phase and the joint dynamics of the swing leg; and
when the impact is not indicative of the touchdown of the swing leg, classifying, by the data processing hardware, a cause of the impact based on the odometry of the robot and the joint dynamics of the swing leg.
2. The method of claim 1, further comprising generating, by the data processing hardware, a response for the swing leg of the robot based on the classified cause of the impact.

3. The method of claim 1, further comprising, when the impact is indicative of the touchdown of the swing leg, changing, by the data processing hardware, a classification of the swing leg to a stance leg.

4. The method of claim 1, further comprising, elevating the swing leg as a response to the respective impact when the cause of the impact is classified as a trip.

5. The method of claim 1, wherein classifying the cause of the impact comprises:
   determining that a percent completion of the swing phase for the swing leg of the robot satisfies a swing phase threshold based on the joint dynamics of the swing leg, the swing phase threshold indicating that the swing leg is early in the swing phase; and
   classifying the cause of the impact on the swing leg as a liftoff scuffing,
   wherein the swing leg continues performing the swing phase of the gait responsive to classifying the cause of the impact on the swing leg as the liftoff scuffing.

6. The method of claim 1, wherein classifying the cause of the impact comprises:
   determining that a hip joint of the swing leg exceeds a pre-determined motion limit based on the joint dynamics of the swing leg, the joint dynamics comprising an abduction-adduction component of the hip joint relative to the ground surface and a flexion-extension component of the hip joint relative to the ground surface, the abduction-adduction component comprising the pre-determined motion limit as a function of the flexion-extension component; and
   classifying the cause of the impact on the swing leg as the swing leg contacting a body of the robot,
   wherein the swing leg continues performing the swing phase of the gait responsive to classifying the cause of the impact on the swing leg as the swing leg contacts the body of the robot.

7. The method of claim 1, wherein classifying the cause of the impact comprises:
   determining that a vector distance between a first closest point of the swing leg to a contralateral leg and a second closest point of the contralateral leg to the swing leg indicates the swing leg crossed the contralateral leg;
   determining that a distal end of the swing leg crossed a respective distal end of the contralateral leg;
   determining that a first knee joint of the swing leg crossed a second knee joint of the contralateral leg;
   classifying a condition causing the respective impact for the swing leg of the robot as the swing leg crossed the contralateral leg of the robot; and
   moving the swing leg to uncross with the contralateral leg of the robot.

8. The method of claim 7, wherein classifying the condition for the swing leg of the robot corresponding to the respective impact further comprises:
   determining that the swing leg is positioned near a contralateral leg of the robot;
   determining that the unexpected torque corresponding to the respective impact results from joint dynamics predominantly from a lateral component of a hip joint of the swing leg;
   classifying the condition causing the respective impact for the swing leg of the robot as uncrossed contralateral leg impact; and
   moving the swing leg away from a sagittal plane of the robot.

9. The method of claim 7, wherein classifying the condition for the swing leg of the robot corresponding to the respective impact further comprises:
   determining that a knee of the swing leg is moving backwards during the swing phase;
   determining that the joint dynamics resulting in the unexpected torque corresponding to the respective impact comprise a flexion-extension torque about a hip joint of the swing leg that is greater than both a knee torque of the swing leg and an adduction-abduction torque about a hip joint of the swing leg;
   classifying the condition causing the respective impact for the swing leg of the robot as the knee of the swing leg contacting terrain behind a body of the robot; and
   shifting the knee of the swing leg forward relative to the body of the robot.

10. The method of claim 7, wherein classifying the condition for the swing leg of the robot corresponding to the respective impact further comprises:
    determining that a knee of the swing leg is adjacent to a perceived ground surface, the knee moving forward relative to a body of the robot, the perceived ground surface defined by sensor data about the robot;
    determining that the knee of the swing leg is closer to the perceived ground surface than a distal end of the swing leg;
    determining that the unexpected torque corresponding to the respective impact occurs at a hip joint of the swing leg;
    classifying the condition causing the respective impact for the swing leg of the robot as the knee of the swing leg contacting terrain underneath the body of the robot; and
    continuing movement of the swing leg without response to the knee of the swing leg contacting terrain underneath the body of the robot.

11. The method of claim 1, wherein determining whether the unexpected torque on the swing leg of the robot corresponds to the impact on the swing leg comprises determining whether the unexpected torque satisfies an impact detection threshold, the impact detection threshold comprising a magnitude of torque that corresponds to a known impact.

12. The method of claim 1, further comprising determining, by the data processing hardware, the unexpected torque on the swing leg based on:
    a measured torque measured by joint torque sensors about the robot;
    a first expected torque representing a respective torque caused by gravity; and
    a second expected torque representing a corresponding torque to accelerate the swing leg of the robot.

13. The method of claim 1, further comprising, when a joint of the swing leg of the robot is at a limit on a range of motion for the joint, determining, by the data processing hardware, that the unexpected torque fails to indicate the impact on the swing leg during the swing phase.

14. The method of claim 1, wherein determining whether the unexpected torque on the swing leg corresponds to the impact on the swing leg comprises determining that the unexpected torque on the swing leg corresponds to an impact torque, the impact torque opposing motion of a joint of the swing leg.

15. The method of claim 1, wherein the joint dynamics of the swing leg correspond to joint dynamics of a knee joint of the swing leg and joint dynamics of a hip joint of the swing leg.

16. The method of claim 15, wherein the joint dynamics of the hip joint comprise an abduction-adduction torque abducting or adducting the swing leg and a flexion-extension torque flexing or extending the swing leg.

17. A robot comprising:
a body;
two or more legs coupled to the body and configured to traverse an environment, the two or more legs comprising a swing leg; and
a control system in communication with the two or more legs, the control system comprising data processing hardware and memory hardware in communication with the data processing hardware, the memory hardware storing instructions that when executed on the data processing hardware cause the data processing hardware to perform operations comprising:
receiving joint dynamics for the swing leg of the robot, the swing leg performing a swing phase of a gait of the robot;
receiving odometry defining an estimation of a pose of the robot relative to a world reference frame;
determining whether an unexpected torque on the swing leg corresponds to an impact on the swing leg; and
when the unexpected torque on the swing leg corresponds to the impact:
determining whether the impact is indicative of a touchdown of the swing leg on a ground surface about the robot based on a percent completion of the swing phase and the joint dynamics of the swing leg; and
when the impact is not indicative of the touchdown of the swing leg, classifying a cause of the impact based on the odometry of the robot and the joint dynamics of the swing leg.

18. The robot of claim 17, wherein the operations further comprise generating a response for the swing leg of the robot based on the classified cause of the impact.

19. The robot of claim 17, wherein the operations further comprise, when the impact is indicative of the touchdown of the swing leg, changing a classification of the swing leg to a stance leg.

20. The robot of claim 17, wherein the operations further comprise elevating the swing leg as a response to the respective impact when the cause of the impact is classified as a trip.

21. The robot of claim 17, wherein classifying the cause of the impact comprises:
determining that a percent completion of the swing phase for the swing leg of the robot satisfies a swing phase threshold based on the joint dynamics of the swing leg, the swing phase threshold indicating that the swing leg is early in the swing phase; and
classifying the cause of the impact on the swing leg as a liftoff scuffing,
wherein the swing leg continues performing the swing phase of the gait responsive to classifying the cause of the impact on the swing leg as the liftoff scuffing.

22. The robot of claim 17, wherein classifying the cause of the impact comprises:
determining that a hip joint of the swing leg exceeds a pre-determined motion limit based on the joint dynamics of the swing leg, the joint dynamics comprising an abduction-adduction component of the hip joint relative to the ground surface and a flexion-extension component of the hip joint relative to the ground surface, the abduction-adduction component comprising the pre-determined motion limit as a function of the flexion-extension component; and
classifying the cause of the impact on the swing leg as the swing leg contacting a body of the robot,
wherein the swing leg continues performing the swing phase of the gait responsive to classifying the cause of the impact on the swing leg as the swing leg contacting the body of the robot.

23. The robot of claim 17, wherein classifying the cause of the impact comprises:
determining that a vector distance between a first closest point of the swing leg to a contralateral leg and a second closest point of the contralateral leg to the swing leg indicates the swing leg crossed the contralateral leg;
determining that a distal end of the swing leg crossed a respective distal end of the contralateral leg;
determining that a first knee joint of the swing leg crossed a second knee joint of the contralateral leg;
classifying a condition causing the respective impact for the swing leg of the robot as the swing leg crossed the contralateral leg of the robot; and
moving the swing leg to uncross with the contralateral leg of the robot.

24. The robot of claim 23, wherein classifying the condition for the swing leg of the robot corresponding to the respective impact further comprises:
determining that the swing leg is positioned near a contralateral leg of the robot;
determining that the unexpected torque corresponding to the respective impact results from joint dynamics predominantly from a lateral component of a hip joint of the swing leg;
classifying the condition causing the respective impact for the swing leg of the robot as uncrossed contralateral leg impact; and
moving the swing leg away from a sagittal plane of the robot.

25. The robot of claim 23, wherein classifying the condition for the swing leg of the robot corresponding to the respective impact further comprises:
determining that a knee of the swing leg is moving backwards during the swing phase;
determining that the joint dynamics resulting in the unexpected torque corresponding to the respective impact comprise a flexion-extension torque about a hip joint of the swing leg that is greater than both a knee torque of the swing leg and an adduction-abduction torque about a hip joint of the swing leg;
classifying the condition causing the respective impact for the swing leg of the robot as the knee of the swing leg contacting terrain behind a body of the robot; and
shifting the knee of the swing leg forward relative to the body of the robot.

26. The robot of claim 23, wherein classifying the condition for the swing leg of the robot corresponding to the respective impact further comprises:
determining that a knee of the swing leg is adjacent to a perceived ground surface, the knee moving forward relative to a body of the robot, the perceived ground surface defined by sensor data about the robot;
determining that the knee of the swing leg is closer to the perceived ground surface than a distal end of the swing leg;
determining that the unexpected torque corresponding to the respective impact occurs at a hip joint of the swing leg;

classifying the condition causing the respective impact for the swing leg of the robot as the knee of the swing leg contacting terrain underneath the body of the robot; and continuing movement of the swing leg without response to the knee of the swing leg contacts terrain underneath the body of the robot.

27. The robot of claim 17, wherein determining whether the unexpected torque on the swing leg of the robot corresponds to the impact on the swing leg comprises determining whether the unexpected torque satisfies an impact detection threshold, the impact detection threshold comprising a magnitude of torque that corresponds to a known impact.

28. The robot of claim 17, wherein the operations further comprise determining the unexpected torque on the swing leg based on:
- a measured torque measured by joint torque sensors about the robot;
- a first expected torque representing a respective torque caused by gravity; and
- a second expected torque representing a corresponding torque to accelerate the swing leg of the robot.

29. The robot of claim 17, wherein the operations further comprise, when a joint of the swing leg of the robot is at a limit on a range of motion for the joint, determining that the unexpected torque fails to indicate the impact on the swing leg during the swing phase.

30. The robot of claim 17, wherein determining whether the unexpected torque on the swing leg corresponds to the impact on the swing leg comprises determining that the unexpected torque on the swing leg corresponds to an impact torque, the impact torque opposing motion of a joint of the swing leg.

31. The robot of claim 17, wherein the joint dynamics of the swing leg correspond to joint dynamics of a knee joint of the swing leg and joint dynamics of a hip joint of the swing leg.

32. The robot of claim 31, wherein the joint dynamics of the hip joint comprise an abduction-adduction torque abducting or adducting the swing leg and a flexion-extension torque flexing or extending the swing leg.

* * * * *